(12) United States Patent
Yang et al.

(10) Patent No.: US 11,828,589 B2
(45) Date of Patent: Nov. 28, 2023

(54) LENGTH GAUGE

(71) Applicant: United States Postal Service, Washington, DC (US)

(72) Inventors: Dongliang Yang, Ellicott City, MD (US); Phuc M. Nguyen, Merrifield, VA (US)

(73) Assignee: United States Postal Service, Washington, DC (US)

( * ) Notice: Subject to any disclaimer, the term of this patent is extended or adjusted under 35 U.S.C. 154(b) by 0 days.

(21) Appl. No.: 17/818,488

(22) Filed: Aug. 9, 2022

(65) Prior Publication Data

US 2023/0052083 A1 Feb. 16, 2023

Related U.S. Application Data

(60) Provisional application No. 63/231,627, filed on Aug. 10, 2021.

(51) Int. Cl.
*G01B 5/02* (2006.01)
*G01B 5/00* (2006.01)

(52) U.S. Cl.
CPC ............. *G01B 5/02* (2013.01); *G01B 5/0004* (2013.01)

(58) Field of Classification Search
CPC ....... G01B 5/02; G01B 5/0004; G01B 5/0007
USPC ............................ 33/436, 571, 706, 707, 708
See application file for complete search history.

(56) References Cited

U.S. PATENT DOCUMENTS

| | | | | |
|---|---|---|---|---|
| 5,456,020 A * | 10/1995 | Kellner | ..................... | G01D 5/34 33/706 |
| 5,959,295 A * | 9/1999 | Braun | .................. | G01D 5/2457 250/237 G |
| 6,166,802 A * | 12/2000 | Kodaira | ............... | G01C 15/006 356/400 |
| 6,658,754 B2 * | 12/2003 | Omi | ................... | G01D 5/34761 33/708 |
| 6,724,186 B2 * | 4/2004 | Jordil | ..................... | G01B 3/205 33/708 |
| 6,826,847 B2 * | 12/2004 | Wahl | .................. | G01D 5/34761 33/706 |
| 8,522,445 B1 * | 9/2013 | Scribante | .................. | B25H 7/02 33/534 |
| 9,234,734 B2 * | 1/2016 | Schmöller | .......... | G01D 5/34769 |
| 9,772,204 B2 * | 9/2017 | Bauer | ................. | G01D 5/34707 |
| 11,639,851 B1 * | 5/2023 | Holder | ..................... | G01C 9/34 33/342 |
| 2015/0191039 A1 * | 7/2015 | Johnson | .................. | B43L 7/027 33/427 |

* cited by examiner

*Primary Examiner* — George B Bennett
(74) *Attorney, Agent, or Firm* — Knobbe Martens Olson & Bear, LLP

(57) ABSTRACT

Devices and methods for quickly and accurately measuring the distance between two carriers of item processing equipment. The devices and methods can include an elongate bar and associated components which may increase the magnitude of lengths that can be measured.

20 Claims, 29 Drawing Sheets

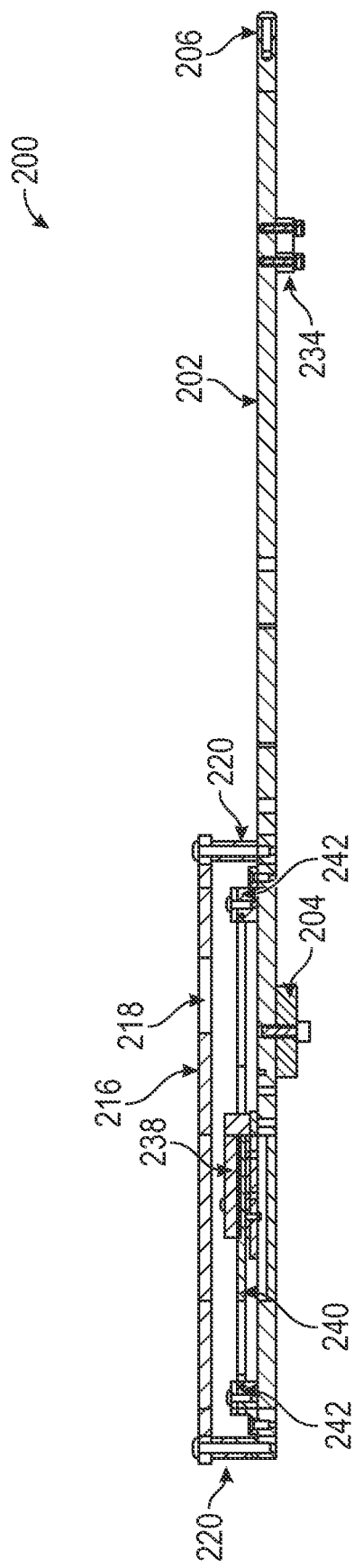

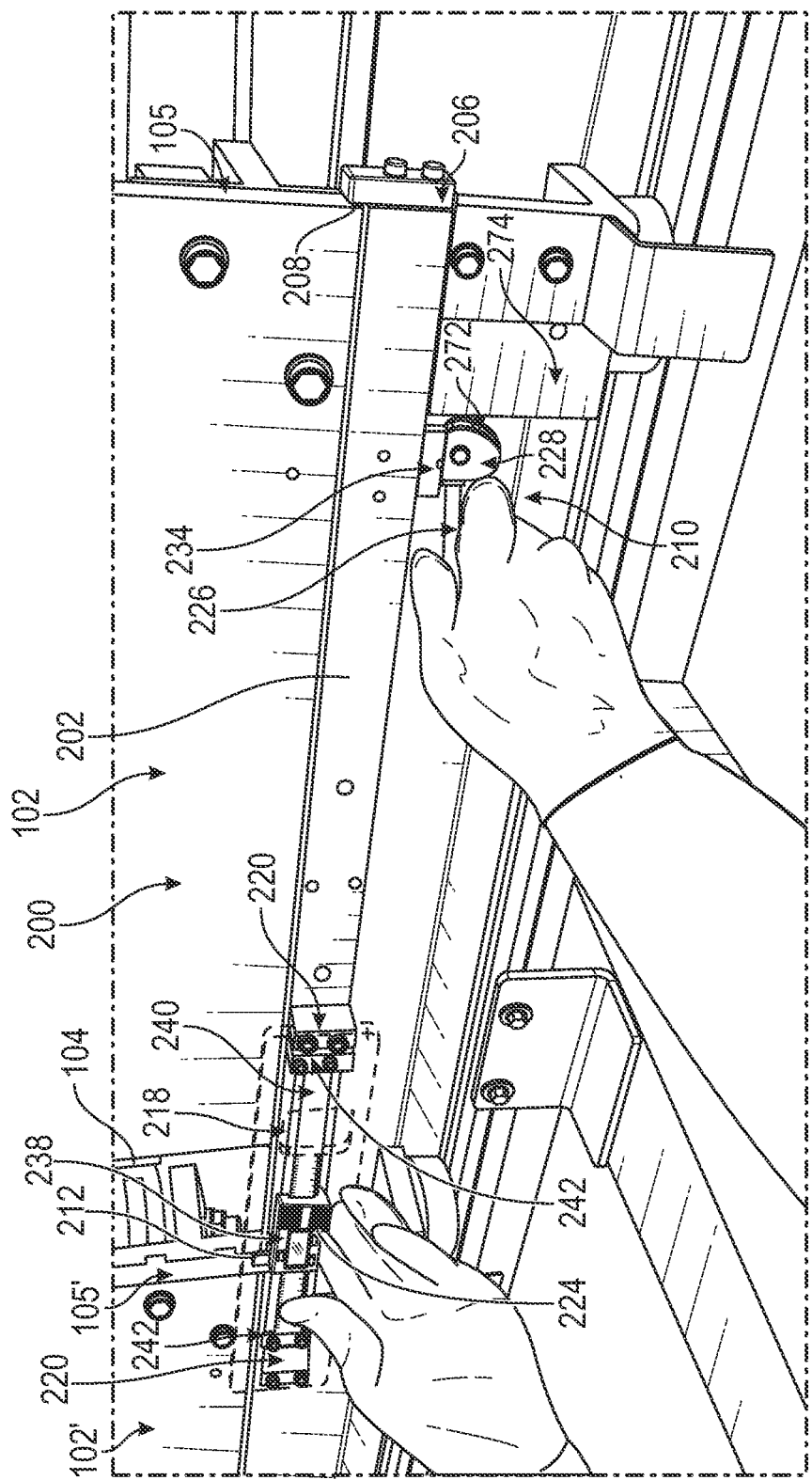

LENGTH GAUGE

CROSS REFERENCE TO RELATED APPLICATIONS

This application claims priority to U.S. Provisional Patent Application No. 63/231,627, filed Aug. 10, 2021, which is incorporated herein by reference in its entirety. Any and all applications, if any, for which a foreign or domestic priority claim is identified in the Application Data Sheet of the present application are hereby incorporated by reference under 37 CFR 1.57.

BACKGROUND

Field

This development relates to devices and methods for measuring the distance between two carriers of item processing equipment.

Description of the Related Art

Item processing equipment can enable vast quantities of items to be automatically and efficiently processed. To maintain proper functioning, item processing equipment may require frequent calibration to avoid processing malfunctions. Thus, devices and methods to facilitate calibration of item processing equipment are greatly desired.

SUMMARY

In some embodiments, a length gauge that can measure a distance between leading edges or trailing edges of carriers of item processing equipment is disclosed herein. The length gauge can include an elongate bar having a first end and a second end opposite the first end. The length gauge can include a reference block disposed on the first end of the elongate bar. The reference block can contact one of a leading edge and a trailing edge of a first carrier. The length gauge can include a hanger disposed between the first and second ends of the elongate bar. The hanger may couple the length gauge to the first carrier. The length gauge can include a scale disposed along a portion of the elongate bar. At least a portion of the scale can be disposed proximate the second end. The length gauge can include a computing device that can be slidably mounted on the scale. The computing device can include a caliper that can contact one of a leading edge and a trailing edge of a second carrier and a display. The display can output a numerical value indicative of a distance between the one of the leading edge and the trailing edge of the first carrier and the one of the leading edge and the trailing edge of the second carrier.

In some embodiments, the length gauge can include a clamp that can secure the length gauge to the first carrier.

In some embodiments, the clamp can include a lever and an engagement portion having a curved periphery. The curved periphery can push against a plate of the first carrier when the lever is rotated in a first direction.

In some embodiments, the curved periphery can terminate contacting the plate of the first carrier when the lever is rotated in a second direction that is opposite the first direction.

In some embodiments, the length gauge can include a guard coupled to the elongate bar, the guard configured to protect one or more features of the length gauge.

In some embodiments, the guard can be spaced away from the elongate bar by one or more spacers and the scale and computing device can be disposed between the guard and the elongate bar.

In some embodiments, the guard can be made of a clear material that can enable a user to view the display of the computing device.

In some embodiments, the guard can include an opening through which a user can access one or more features of the computing device.

In some embodiments, the guard can include a width that is larger than a width of the elongate bar.

In some embodiments, the computing device can include one or more buttons to power the computing device on or off, change measurement units, and/or zero the computing device at an initial position In some embodiments, the computing device can include a tab to facilitate pushing and/or pulling of the computing device along the scale.

In some embodiments, the length gauge can include a screw that can secure the length gauge to the first carrier. The screw may be a thumb screw.

In some embodiments, the scale can be spaced away from the elongate bar to facilitate sliding of the computing device along the scale.

In some embodiments, the elongate bar or scale can include one or more indicia that can indicate a position of the computing device that corresponds to a position between the first and second carriers when the length gauge is mounted to the first carrier.

In some embodiments, a length gauge that can measure a distance between leading edges or trailing edges of carriers of an item processing equipment is disclosed herein. The length gauge can include an elongate bar that can have a first end and a second end opposite the first end. The length gauge can have a reference block disposed on the first end of the elongate bar. The reference block can contact one of a leading edge and a trailing edge of a first carrier. The length gauge can have a hanger disposed between the first and second ends of the elongate bar. The hanger may hang the length gauge from the first carrier. The length gauge can have an elongate plate disposed along a portion of the elongate bar proximate the second end. The length gauge can have a computing device mounted on the elongate plate. The computing device can slide along the elongate plate between an initial position and a second position. The computing device can include a display and a caliper that can contact one of a leading edge and a trailing edge of a second carrier to measure the distance between the initial position and the second position. The display can display an indication of a distance between the initial and second positions that is indicative of the distance between the one of the leading edge and the trailing edge of the first carrier and the one of the leading edge and the trailing edge of the second carrier.

In some embodiments, the length gauge can have a clamp that can be rotated between a locked configuration to secure the length gauge to the first carrier and a released configuration to release the length gauge from the first carrier.

In some embodiments, the length gauge can have a guard that is made of a clear material. The guard can protect one or more features of the length gauge.

The length gauge may include a screw that can secure the length gauge to the first carrier.

In some embodiments, the guard can be spaced away from the elongate bar by one or more spacers.

In some embodiments, the elongate bar or scale can include one or more indicia that can indicate a position of the computing device that corresponds to a position between the first and second carriers when the length gauge is mounted to the first carrier.

In some embodiments, a method of measuring the distance between the leading edges or the trailing edges of two carriers is disclosed herein. The method can include positioning a computing device of a length gauge at an initial position. The method can include zeroing the computing device at the initial position. The method can include moving the computing device to a second position between at least two indicia disposed on a scale or elongate bar of the length gauge. The method can include connecting the length gauge to a first carrier such that a reference block of the length gauge contacts one of a leading edge and a trailing edge of the first carrier. The method can include moving the computing device such that a caliper thereof contacts one of a leading edge and a trailing edge of a second carrier. The method can include securing the length gauge to the first carrier. The computing device can display an indication of a distance between the first and second positions that can be indicative of the distance between the one of the leading edge and the trailing edge of the first carrier and the one of the leading edge and the trailing edge of the second carrier.

In some embodiments, securing the length gauge to the first carrier can include rotating a curved periphery of the length gauge to push against a plate of the first carrier, which can result in the plate being held between the reference block and curved periphery of a clamp of the length gauge.

In some embodiments, securing the length gauge to the first carrier can include rotating a screw to push against a plate of the first carrier, which can result in the plate being held between the reference block and an end of the screw.

BRIEF DESCRIPTION OF THE DRAWINGS

The foregoing and other features of the disclosure will become more fully apparent from the following description and appended claims, taken in conjunction with the accompanying drawings. Understanding that these drawings depict only several embodiments in accordance with the disclosure and are not to be considered limiting of its scope, the disclosure will be described with the additional specificity and detail through use of the accompanying drawings.

FIG. 4D shows another section view of the exemplary length gauge of FIG. 4A.

FIG. 6E shows the length gauge coupled to the first carrier with a lever of the clamp being rotated to place the clamp in a locked configuration.

DETAILED DESCRIPTION

In some embodiments, item processing equipment can be used to process items, such as mail pieces, envelopes, packages, letters, parcels, sacks, bags, boxes, etc. For example, item processing equipment can be used in warehouses, distribution facilities, delivery centers, mail processing center environments, and/or distribution networks, such as the United States Postal Service (USPS).

Item processing equipment can include a train of units, such as item carriers, bins, slots, sorting containers, and the like, connected in a loop or running run along a fixed length rail or path. The distance between units in the train must be set accurately in order to avoid stress on the mechanical joints between units, to reduce play and potential damage in the train, and to operate efficiently. Units in the train may be removed and/or replaced for a variety of reasons. In some embodiments, units of different lengths may be utilized in a single train, and can be swapped or changed as desired. Setting the distance between units can ensure proper operation of the item processing equipment. For example, if the distance between units is not set accurately, the timing to eject an item out of a unit may be inaccurate, which may result in a high mis-charge or reject rate. The distance between units can be a function of the length of the rail or path, the length of the units in the train, and the number of units in the train. Tools as described herein can be useful for quickly, efficiently, and accurately setting the distance between units in a train in item processing equipment.

Figure 1:
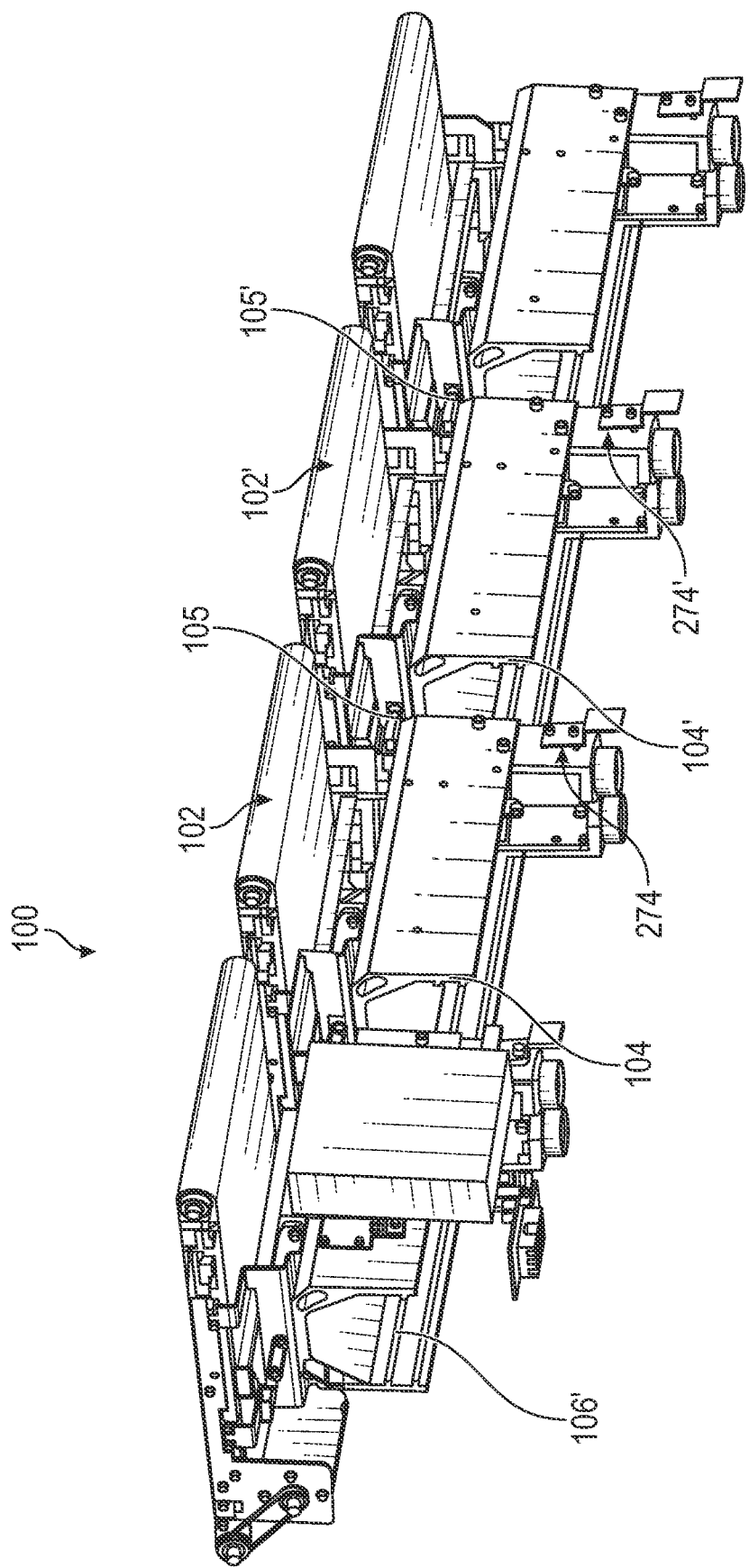
FIG. 1 shows an exemplary segment of item processing equipment.

FIG. 1 shows exemplary item processing equipment 100. The item processing equipment 100 can include a plurality of carriers 102, which can be mounted on a rail 106. One or more motors can be used to move the plurality of carriers 102 along the rail 106. Each of the carriers 102 can include a plate 274, which can also be referred to as a flange or projection. The carriers 102 can be used to transport one or more items, which can include transporting a container that can transport a plurality of items. Each of the carriers 102 can include a leading edge 104 and trailing edge 105. The leading edges 104 can be spaced away from each other at a predetermined distance to promote functionality of the item processing equipment 100. The trailing edges 105 can be spaced away from each other at a predetermined distance to promote functionality of the item processing equipment 100. For example, a first carrier 102 can have a leading edge 104 that is spaced away a distance (e.g., 500 mm) from a leading edge 104' of a second carrier 102'. For example, a first carrier 102 can have a trailing edge 105 that is spaced away a distance (e.g., 500 mm) from a trailing edge 105' of a second carrier 102'. The distance between adjacent leading edges 104 and/or trailing edges 105 of the carriers 102 can be set within a predetermined range to prevent processing malfunctions by the item processing equipment 100 and/or associated equipment. For example, in some variants, the leading edges 104 and/or trailing edges 105 can be spaced apart from each other by 500 mm with a tolerance of ±6 mm. During use of the item processing equipment 100, the distance between leading edges 104 and/or trailing edges 105 may inadvertently be increased or decreased beyond the tolerated range. Sometimes one or more carriers 102 can be removed, replaced, repositioned, or exchanged with another carrier within the train. In some cases the carriers 102 can be of different sizes or lengths. Accordingly, the distance between the leading edges 104 and/or trailing edges 105 may be periodically adjusted to set the distance to within a tolerance range, to promote proper operation of the item processing equipment 100. However, measuring the distance between the leading edges 104 and/or trailing edges 105 of the carriers 102 can be time consuming and inaccurate using conventional tools. For instance, calipers suited for measuring the distance between carriers 102 can be inordinately expensive due to at least size, and manual adjustment using calipers can be can be error prone. Accordingly, devices and methods are disclosed herein that facilitate the efficient and inexpensive measuring of the distance between the leading edges 104 and/or trailing edges 105.

Figure 2:
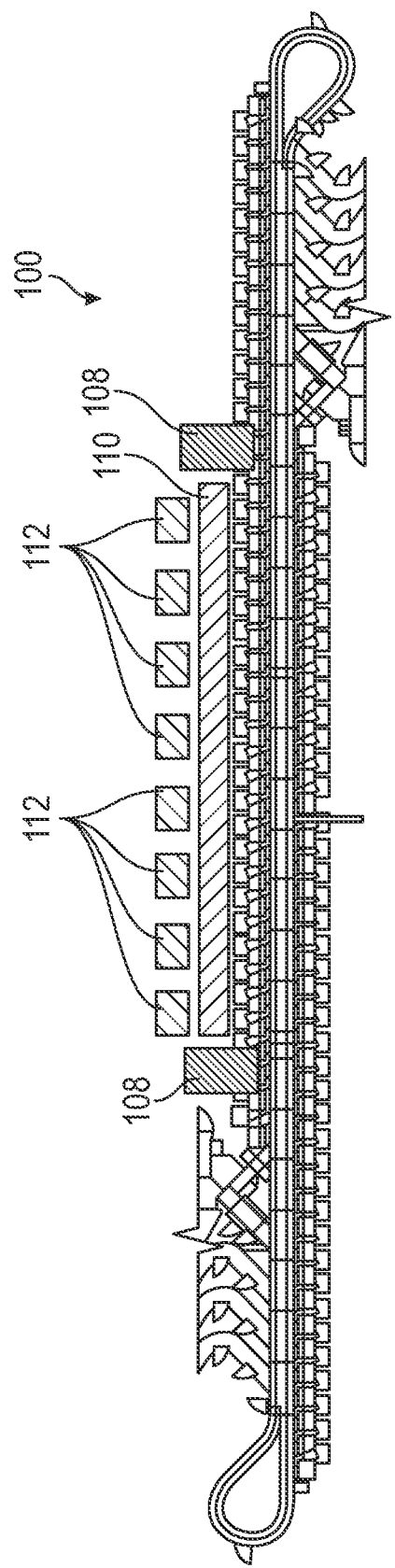
FIG. 2 shows an exemplary schematic of item processing equipment.

To facilitate additional example context, FIG. 2 shows an exemplary schematic of item processing equipment 100. The item processing equipment 100 can include one or more trains 110 of carriers 102, each of which can include fifty-six carriers 102. The train 110 can include a plurality of segments 112, which can each include seven carriers 102. A slip joint 108 can be disposed at opposing sides or ends of the train 110. As described herein, the trains 110 can be mounted on a rail.

Figure 3:
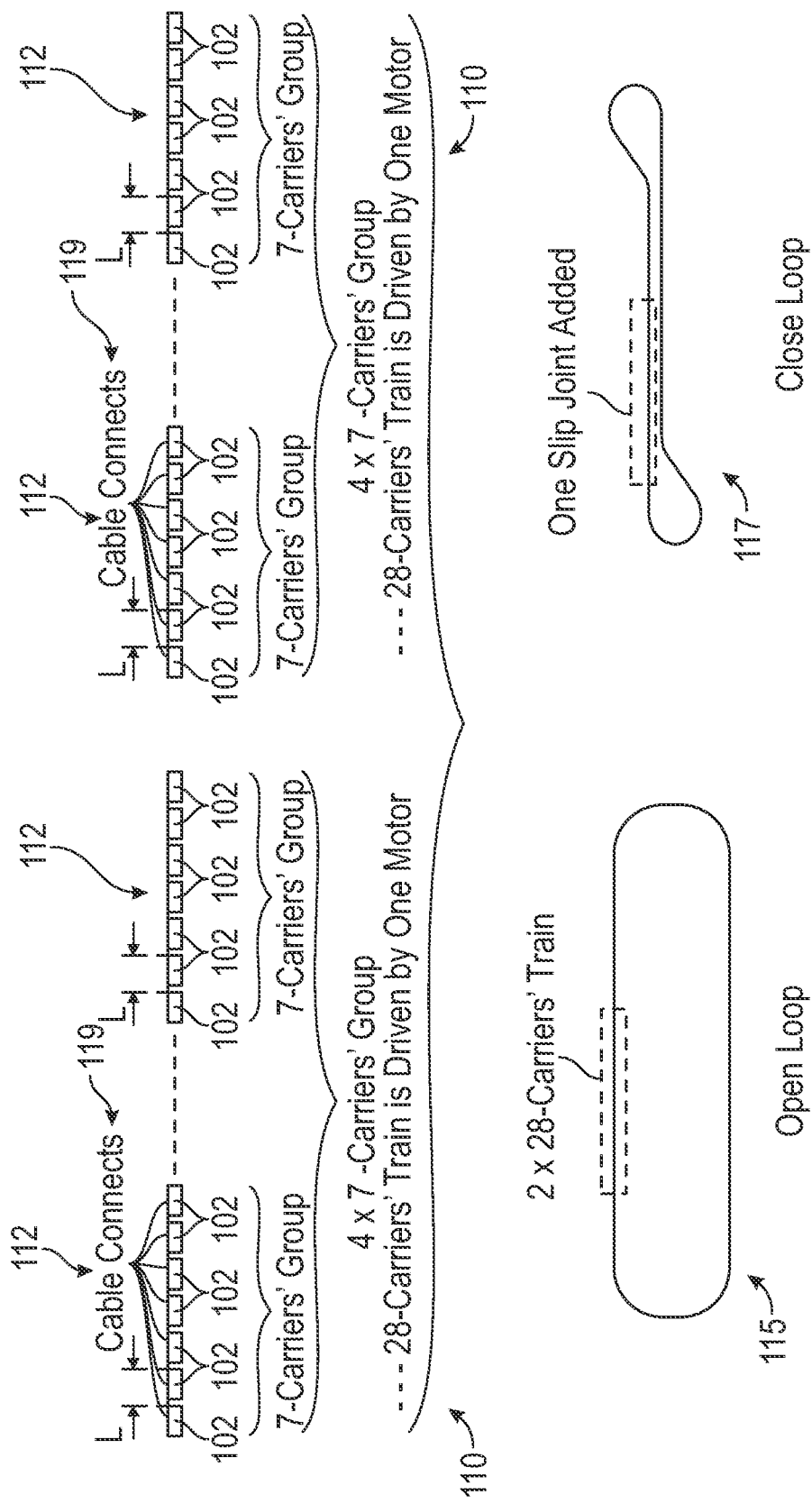
FIG. 3 shows an exemplary organization for item processing equipment.

FIG. 3 shows organizational information for item processing equipment 100. The item processing equipment 100 can include two twenty-eight carrier trains 110. The two twenty-eight carrier trains 110 can be arranged into an open loop 115 and/or closed loop 117 with one or more slip joints. The each of the trains 110 can be driven by one or more motors. As illustrated, cable connectors 119 or the like (e.g., links, bars, etc.) can connect adjacent carriers 102, which can allow a segment 112 and/or train 110 of carriers 102 to move together.

FIGS. 4A-4I show various views of an exemplary length gauge 200, which can also be referred to as a length measuring device, measuring device, distance measuring device, calibration device, tuning device, etc. The distance between leading edges 104 and/or trailing edges 105 of adjacent carriers 102 can fall between an expected range or can have a minimum length. Accordingly, the length gauge 200 can include a fixed length (e.g., 500 millimeters) portion to measure at least a part of the distance between leading edges 104 and/or trailing edges 105 and an adjustable high accuracy portion slidably mounted on a scale to measure distances greater than the fixed length (e.g., 500-650 millimeters). Having a fixed length portion to measure a part of the distance between leading edges 104 and/or trailing edges 105 of adjacent carriers 102 and an adjustable portion to measure distances beyond than the fixed length can reduce the cost of manufacturing the length gauge 200 compared to an entirely adjustable length gauge that can measure distances from zero millimeters to the fixed length and beyond.

Figure 4A:
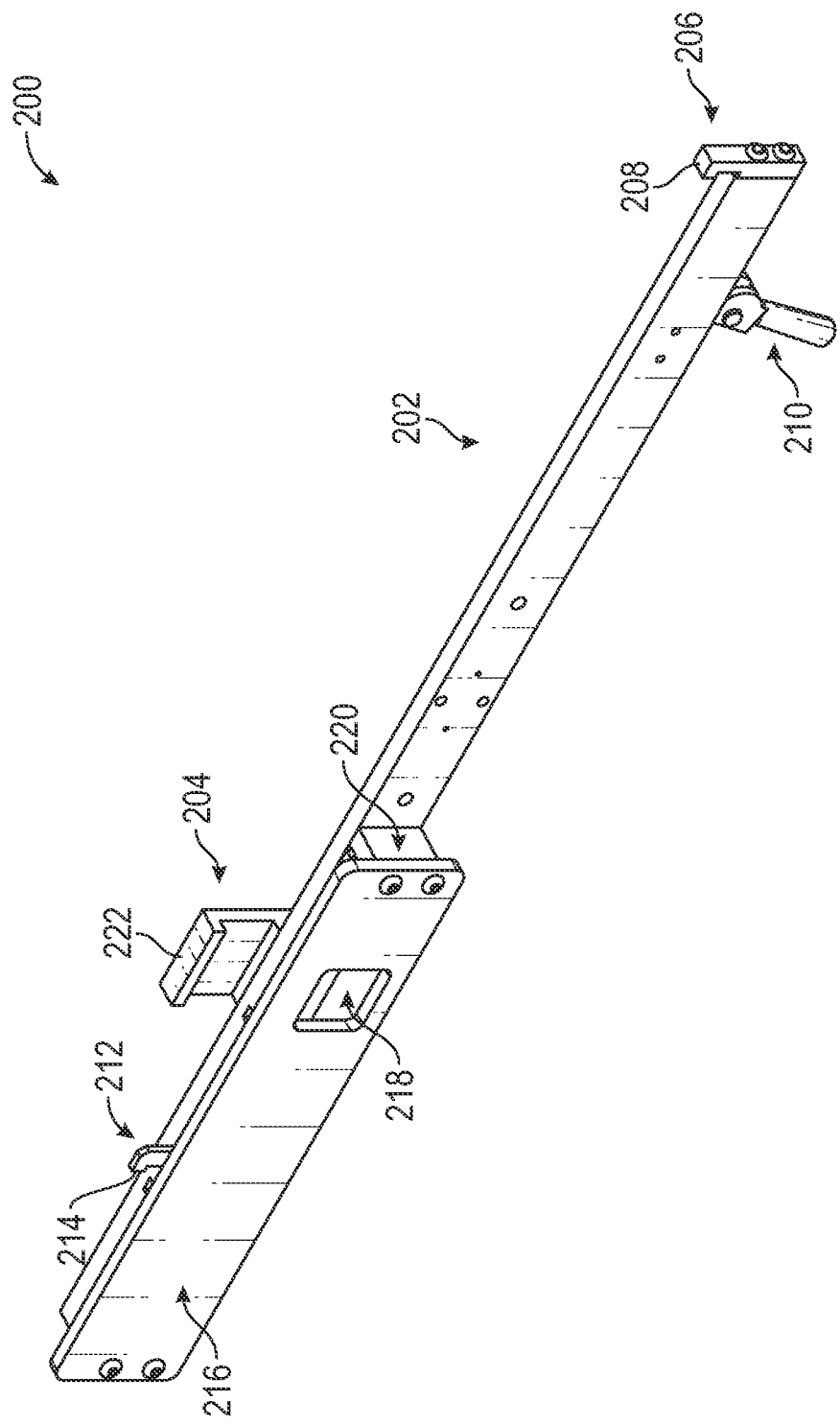
FIG. 4A shows an exemplary length gauge.

As shown in FIG. 4A, the length gauge 200 can include an elongate bar 202, which can also be referred to as a bar and/or elongate structure. The elongate bar 202 can have varying peripheries, which can at least include polygonal (e.g., square, rectangle, etc.). The elongate bar 202 can provide the fixed length portion for measuring a portion of the distance between the leading edges 104 and/or trailing edges 105 of adjacent carriers 102.

The length gauge 200 can include a hanger 204, which can also be referred to as a hook, holder, and/or clip, as shown in FIG. 4A. The hanger 204 can be used to couple the length gauge 200 to a carrier 102. The hanger 204 can be disposed at varying positions along the elongate bar 202. For example, the hanger 204 can be disposed proximate an end of the elongate bar 202 and/or centrally disposed between the ends of the elongate bar 202. In some embodiments, the hanger 204 can be disposed proximate a gravitational center of the length gauge 200. In some embodiments, the hanger 204 can be disposed at a position on the elongate bar 202 which corresponds to an average, approximate, or expected distance between carriers 102. The hanger 204 can be positioned along the elongate bar 202 such that the hanger 204 can connect to, engage with, or contact a first carrier 102 and an end of the elongate bar 202 can contact a second carrier 102. The hanger 204 can extend from the elongate bar 202 in a direction that is transverse, which can include perpendicular, relative to the longitudinal direction of the elongate bar 202. For example, the hanger 204 can include a lip, protrusion, or edge 222 that can contact a ledge and/or be inserted into a groove of the carrier 102 to couple to and/or hang the length gauge 200 on the carrier 102. The hanger 204 can be formed as an integral part of the elongate bar 202 or coupled thereto, for example, by being bolted, welded, or otherwise fastened to the elongate bar 202.

The length gauge 200 can include a reference block 206. The reference block 206 can be disposed on an end of the elongate bar 202. The reference block 206 can contact a leading edge 104 or trailing edge 105 of a carrier 102 with a contact surface 208 thereof when measuring the distance between leading edges 104 or trailing edges 105 of adjacent carriers 102. The contact surface 208 can be configured for measuring. For example, the contact surface 208 can be polished and/or otherwise finished to promote accurate measuring. The contact surface 208 can be flat. The reference block 206 can be formed as part of the elongate bar 202 or coupled thereto, which can include being bolted to the elongate bar 202. The reference block 206 may be a block and/or bar.

The length gauge 200 can include a clamp 210, which can also be referred to as a fastener. The clamp 210 can be used to secure, lock, removably attach the length gauge 200 to the carrier 102. The clamp 210 can be connected to the elongate bar 202. The clamp 210 can be moved in a first direction to secure the length gauge 200 to the carrier 102 and moved in a second direction to release the length gauge 200 from the carrier 102. The clamp 210 can be disposed at varying positions along the elongate bar 202, which can include being positioned proximate the end of the elongate bar 202 having the reference block 206.

The length gauge 200 can comprise a guard 216. The guard 216 can protect various features of the length gauge 200, such as the computing device, scale, and/or other components of the length gauge 200. The guard 216 can include rounded corners to reduce and/or eliminate stress concentrators. The guard 216 can include a width that is larger than that of the elongate bar 202. The guard 216 can include a length that extends along a portion of the elongate bar 202. For example, in some embodiments, the guard 216 can extend from an end of the elongate bar 202 that is opposite the reference block 206 to an intermediate location between the ends of the elongate bar 202. The guard 216 can be made of a clear or semi-clear material, such as plastic, polycarbonate, acrylic, plexiglass, etc., to enable a user to view a display of an electronic measuring device, digital caliper, scale, and/or other components of the length gauge 200 through the guard 216 during use. The guard 216 can include an opening 218, which can also be referred to as a window. The opening 218 can enable a user to reach therethrough to interact with one or more features (e.g., buttons) of the electronic measuring device. The opening 218 can have varying peripheries, which can include polygonal (e.g., square, rectangular, circular, oval, etc.). The opening 218 can have rounded corners, which can reduce and/or eliminate stress concentrators and/or improve user comfort. The guard 216 can be coupled to the elongate bar 202, which can include being coupled to the elongate bar 202 with one or more bolts. The guard 216 can be spaced away from the elongate bar 202 with one or more spacers 220, which can also be referred to as blocks, supports, etc. The one or more spacers 220 can space the guard 216 way from the elongate bar 202 such that one or more features, such as the computing device, scale, etc., can be disposed between the guard 216 and the elongate bar 202.

The length gauge 200 can include a caliper 212, which can also be referred to as an indicator. The caliper 212 can include a caliper contact surface 214, which can also be referred to as a contact surface, that can contact a leading edge 104' or trailing edge 105' of a carrier 102'. The caliper contact surface 214 can be flat. To measure the distance between adjacent leading edges or trailing edges, the caliper contact surface 214 of the caliper 212 can be moved to contact the leading edge 104' or trailing edge 105' of a carrier 102' and the contact surface 208 of the reference block 206 can contact the leading edge 104 or trailing edge 105 of an adjacent carrier 102. The caliper 212 can be part of the electronic measurement device, or can be connected to a computing device local to or remote from the length gauge 200, such that position of the caliper 212 changes a measurement indicated by the computing device on a local or remote display.

Figure 4B:
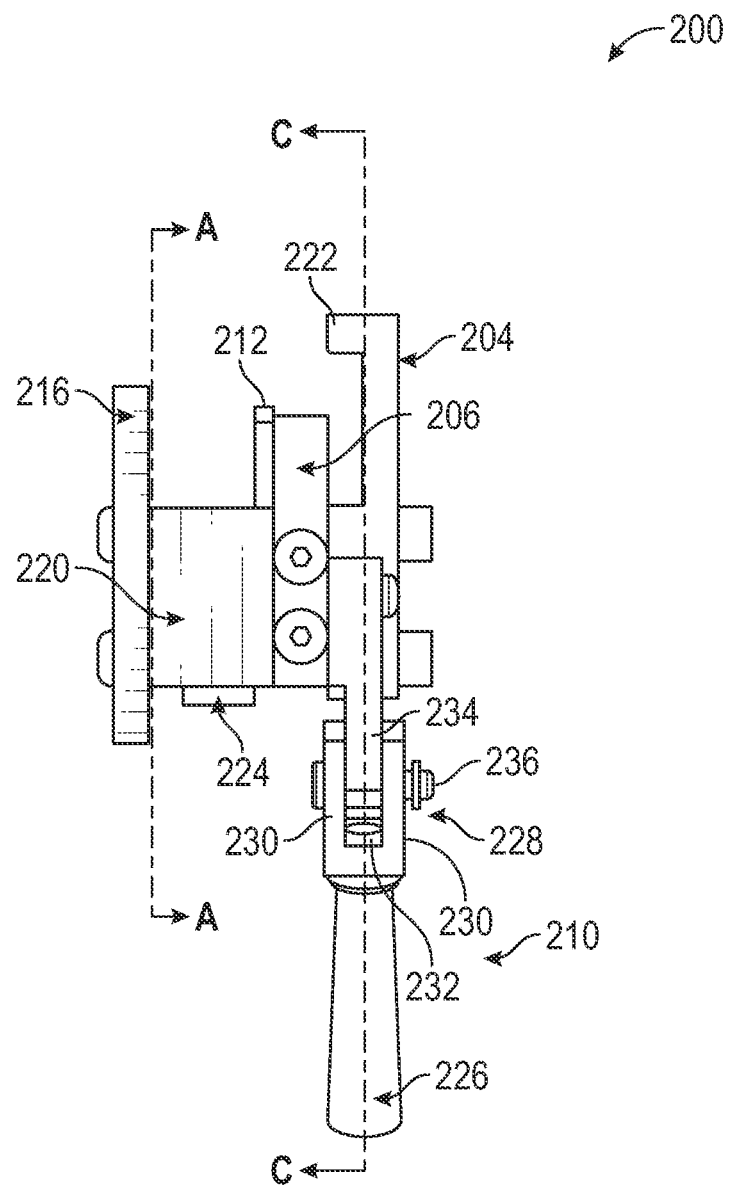
FIG. 4B shows a side view of the exemplary length gauge of FIG. 4A.

FIG. 4B illustrates a side view of the length gauge 200. As shown, a tab 224 can extend away from, for example downward from the computing device. A user or automated component can interact with the tab 224 (e.g., push or pull) to adjust the position of the caliper 212 to engage or contact a leading edge 104 or trailing edge 105 of a carrier 102 or to place the caliper 212 in a zeroed position.

The length gauge 200 can include a mount 234. The mount 234 can be mounted on the elongate bar 202, which can be mounted on a side (e.g., back side) of the elongate bar 202 that is opposite the guard 216. The mount 234 can extend away from the elongate bar 202, which can include in a direction that is transverse and/or perpendicular relative to the longitudinal direction of the elongate bar 202. The mount 234 can be formed as part of the elongate bar 202 and/or coupled thereto, which can being bolted thereto.

The clamp 210 can be coupled to the mount 234. For example, the clamp 210 can include an engagement portion 228 that can include a pair of flanges 230 separated by a gap 232. The clamp 210 can be positioned such that the mount 234 is disposed in the gap 232 that is between the flanges 230. A bolt 236 (e.g., rod, pin, etc.) can be disposed through the flanges 230 and mount 234 to secure the clamp 210 to the mount 234. The clamp 210 can include a lever 226, e.g., grasping portion, that can be grasped by the user or moved by an automated component to rotate the clamp 210 about the bolt 236 between the locked and released configurations.

Figure 4C:
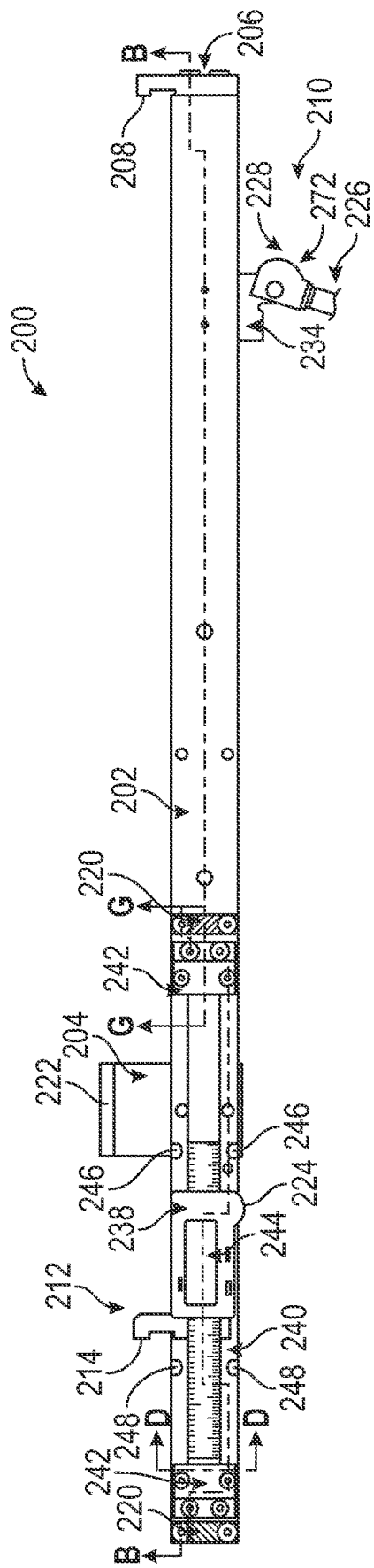
FIG. 4C shows a section view of the exemplary length gauge of FIG. 4A.

FIG. 4C shows a section view of the length gauge 200 along section A-A illustrated in FIG. 4B such that the features disposed between the guard 216 and the elongate bar 202 are visible. As shown, the length gauge 200 can include a scale 240 or elongate plate. The scale 240 can include markings indicative of a distance. The scale 240 can be coupled to the elongate bar 202. The scale 240 can be disposed between the spacers 220 spacing the guard 216 away from the elongate bar 202. The scale 240 can be coupled to the elongate bar 202 with supports 242. The supports 242 can be coupled to the elongate bar 202, which can be by way of one or more bolts. The distance between the contact surface 208 of the reference block 206 and a far edge of the proximate support 242 can be a set distance to facilitate measuring a distance that is greater than a length of the scale 240. For example, the effective measuring length of the length gauge 200 can be the distance between the contact surface 208 of the reference block 206 and the caliper 212 when the computing device 238 is contacting a far edge of the proximate support 242 relative to the reference block 206 (e.g., five hundred millimeters or other distances) plus the length of the scale 240. In some variants, the scale 240 can have a measuring portion that is six inches or one hundred and fifty millimeters in length such that the effective measuring distance of the length gauge 200 can be five hundred millimeters to six hundred and fifty millimeters. In some variants, the scale 240 can have other lengths.

The length gauge 200 can include an adjustable electronic measurement device or a computing device 238. The computing device 238 can be mounted onto the length gauge 200 such that the computing device 238 can slide along the scale 240. The scale 240 can, in some variants, extend through the computing device 238. As the computing device 238 moves along the scale 240, the computing device 238 can determine the distance traveled from an initial starting point, which can be via a linear encoder such as a capacitive liner encoder. The computing device 238 can include a display 244 through which the computing device 238 can display information to the user such as the distance traveled from the initial starting point.

The length gauge 200 can include a caliper 212 as described herein. The caliper contact surface 214 can be coupled to or be otherwise incorporated with the computing device 238 such that movement of the computing device 238 results in movement of the caliper contact surface 214. The caliper 212, in some variants, can be disposed at a position between the scale 240 and the elongate bar 202.

The elongate bar 202 can include notches (e.g., grooves) or other indicia which can guide placement of the computing device 238 during use. For example, the elongate bar 202 can include a pair of first notches 246 and a pair of second notches 248. In some variants, a single first notch 246 and single second notch 248 can be used. The first notches 246 and second notches 248 can provide an estimate of where to position the computing device 238 such that the computing device 238 is disposed between the carrier 102 and carrier 102' when the length gauge 200 is coupled to the carrier 102. For example, the first notches 246 can indicate where the trailing edge of the carrier 102 is estimated to be positioned and the second notches 248 can indicate where the leading edge 104 or trailing edge 105 of the carrier 102' is estimated to be positioned such that the computing device 238 can be disposed therebetween. As illustrated in FIG. 4C, the computing device 238 can be disposed on the scale 240 between the first notches 246 and the second notches 248. The distance between the first notch 246 and the second notch 248 can be set to an average distance between carriers 102, or can be set to be longer than an expected or threshold distance between carriers. For example, if the threshold or required distance between two carriers 102 is to be 50 mm, the distance between the first and second notches 246, 248 can be set to a multiple, such as 1.5 or 2 times the threshold distance. In some variants, other indicia, such as a symbol, mark, and/or other feature, can be used to guide positioning of the computing device 238. In some variants, the indicia, which can include notches, can be disposed on the scale 240.

As shown in FIG. 4C, the engagement portion 228 of the clamp 210 can include a curved periphery 272. The curved periphery 272 can be shaped such that rotation of the clamp 210 toward the plate 274 pushes the curved periphery 272 against the plate 274, securing (e.g., locking) the length gauge 200 to the carrier 102. Rotation of the clamp 210 away from the plate 274 can release the curved periphery 272 from pushing against the plate 274, releasing the length gauge 200 from the carrier 102.

FIG. 4D shows a section view of the length gauge 200 along section B-B illustrated in FIG. 4C. The guard 216, as described herein, can be spaced away from the elongate bar 202 by spacers 220 such that the scale 240, computing device 238, and associated components can be disposed therebetween. The supports 242 can space the scale 240 away from the elongate bar 202 which can help to enable the computing device 238 to slide along the scale 240.

Figure 4E:
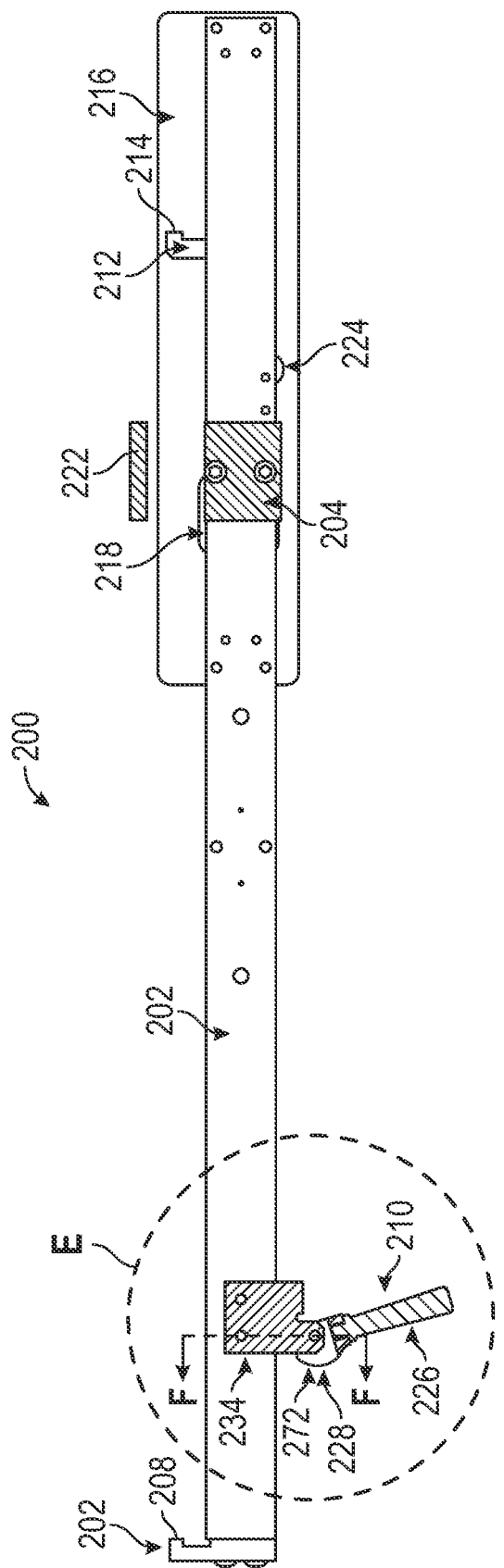
FIG. 4E shows another section view of the exemplary length gauge of FIG. 4A.

FIG. 4E shows a section view of the length gauge 200 along section C-C illustrated in FIG. 4B. This section view depicts the clamp 210 on a rear side of the length gauge 200.

Figure 4F:
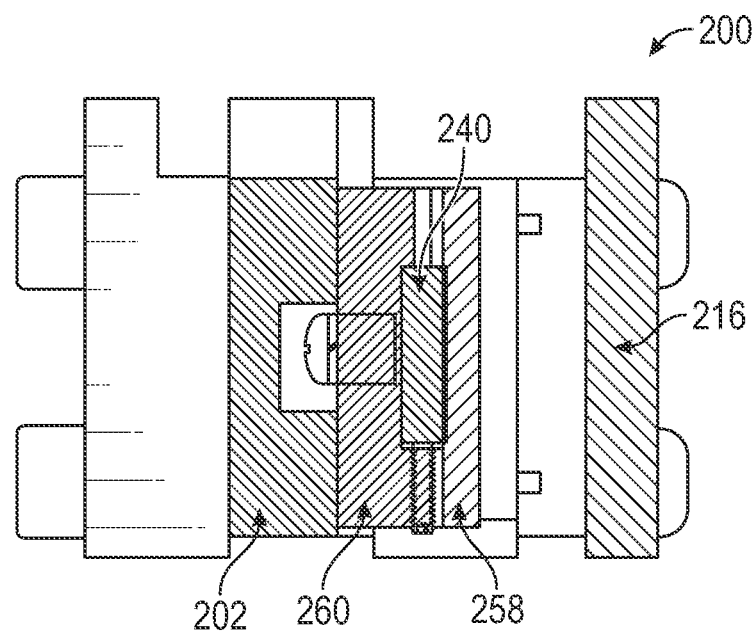
FIG. 4F shows another section view of the exemplary length gauge of FIG. 4A.

FIG. 4F shows a section view of the length gauge 200 along section D-D illustrated in FIG. 4C. As shown, the scale 240 can be disposed between a cap structure 258 and base structure 260, which is described in reference to FIG. 4I.

Figure 4G:
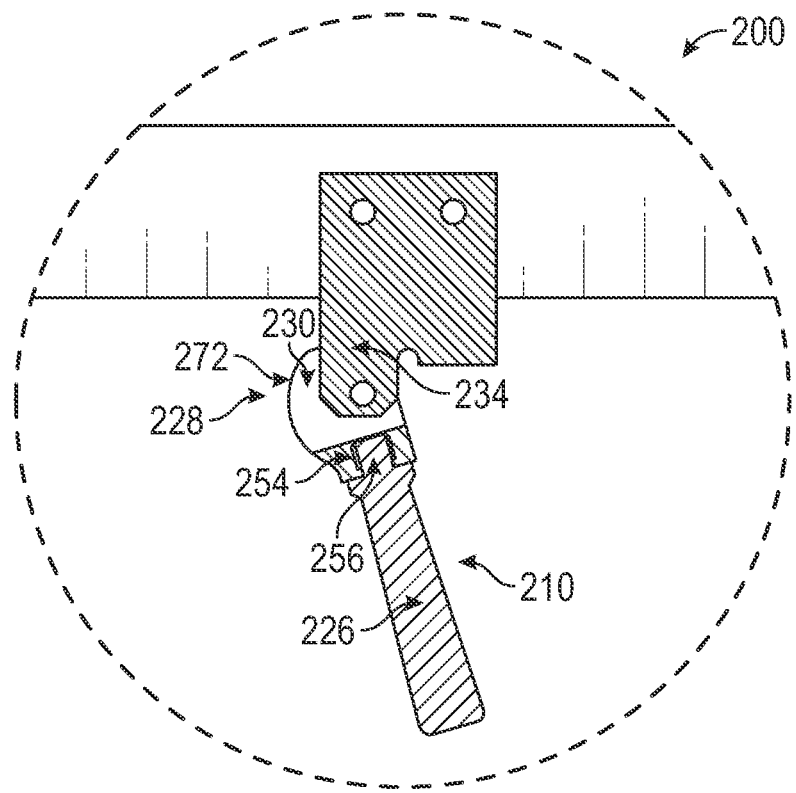
FIG. 4G shows another section view of the exemplary length gauge of FIG. 4A.

FIG. 4G shows a section view of the length gauge 200 along section E illustrated in FIG. 4E. As shown, the lever 226 can include a protrusion 256 disposed at one end that can extend an aperture 254 of the engagement portion 228. In some variants, the aperture 254 and protrusion 256 can be threaded to facilitate a threaded connection.

Figure 4H:
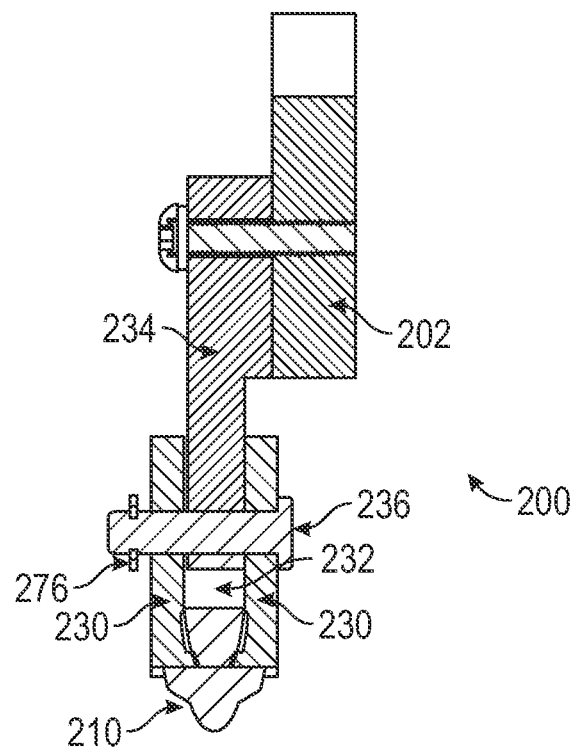
FIG. 4H shows another section view of the exemplary length gauge of FIG. 4A.

FIG. 4H shows a section view of the length gauge 200 along section F-F illustrated in FIG. 4E. As shown, the bolt 236 can be inserted through the flanges 230 and mount 234. A lock pin 276 can be inserted through the bolt 236 to secure the clamp 210 to the mount 234.

Figure 4I:
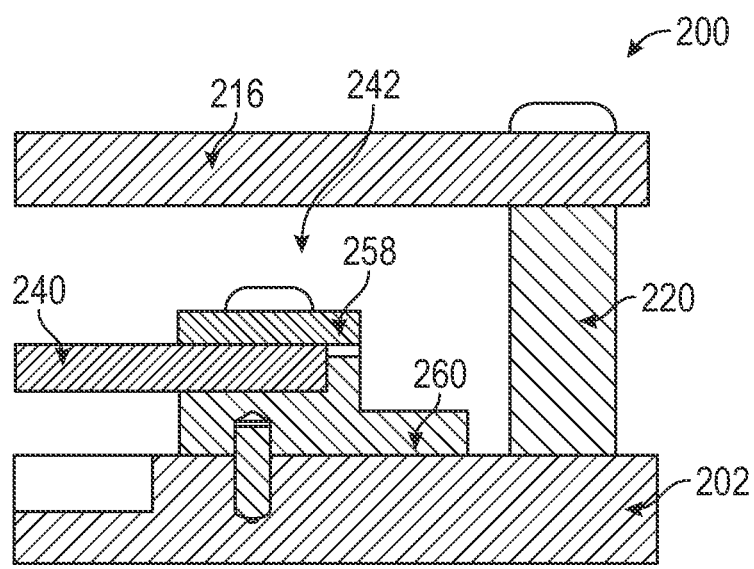
FIG. 4I shows another section view of the exemplary length gauge of FIG. 4I.

FIG. 4I shows a section view of the length gauge 200 along the section G-G illustrated in FIG. 4C. As shown, the supports 242 can include a cap structure 258 that couples to a base structure 260 with the scale 240 disposed therebetween. As described herein, the supports 242 can secure opposing ends of the scale 240 to the elongate bar 202. The base structure 260 can be coupled to the elongate bar 202, which can be by way of a bolt or the like. The cap structure 258 can be coupled to the base structure 260 with the scale 240 therebetween, which can be by way of a bolt or the like.

Figure 5:
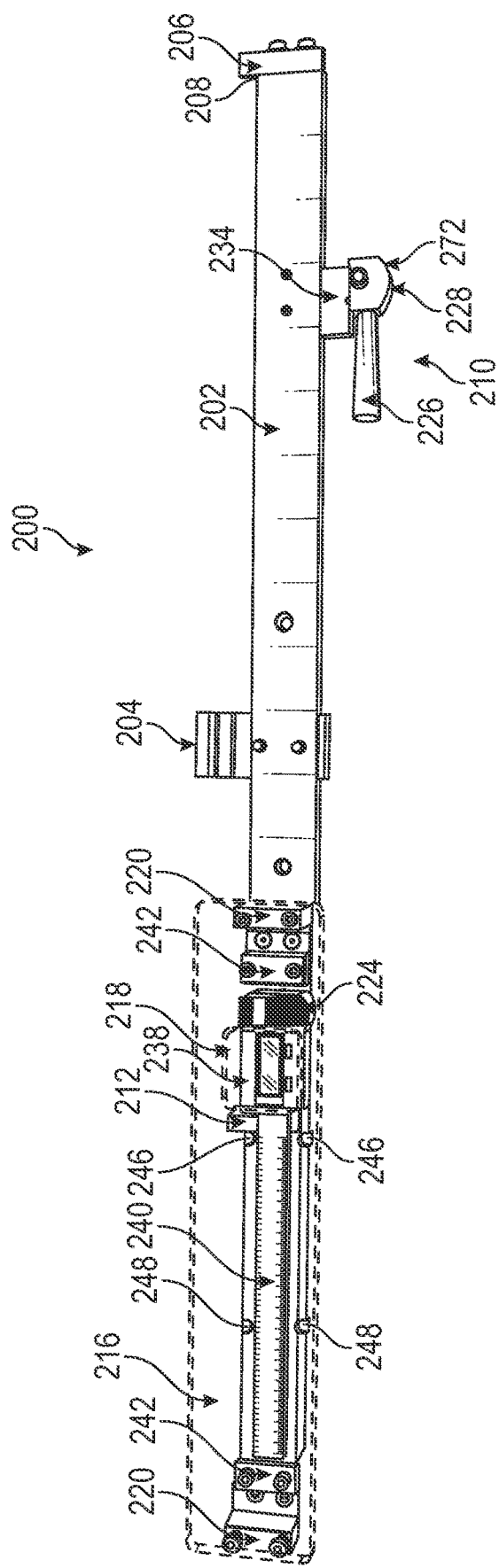
FIG. 5 shows an exemplary length gauge.

FIG. 5 shows the length gauge 200, which can at least include all of the features described herein. As described, the length gauge 200 can include an elongate bar 202. The elongate bar 202 can include a hanger 204 disposed between opposing ends of the elongate bar 202 that can enable the elongate bar 202 to hang from the carrier 102. In contrast to the length gauge 200 illustrated in FIG. 4A, the hanger 204 can be centrally disposed between the opposing ends of the elongate bar 202, which can include being equidistantly spaced from the opposing ends. The length gauge 200 can include a reference block 206. The reference block 206 can be disposed on an end of the elongate bar 202 and can contact a leading edge 104 or trailing edge 105 of the carrier 102 to facilitate measuring the distance between leading edges 104 or trailing edges 105 of adjacent carriers 102. The reference block 206, as described herein, can include a contact surface 208 that is configured to contact the leading edge 104 or trailing edge 105 of the carrier 102.

The length gauge 200 can include a mount 234. The mount 234 can extend outward from the elongate bar 202, which can include extending downward from the elongate bar 202. The length gauge 200 can include a clamp 210, which can be coupled to the mount 234. The clamp 210 can include a lever 226 that can be grasped to rotate the clamp 210 between locked and unlocked configurations. The clamp 210 can include an engagement portion 228, which be disposed on an end of the clamp 210 and can be coupled to the mount 234. As described herein, the engagement portion 228 can include flanges 230 spaced apart from each other by a gap that receives the mount 234 for coupling. The engagement portion 228, e.g., flanges 230, can include a curved periphery 272 that can be configured to push into a plate 274 of the carrier 102 to secure (e.g., lock) the length gauge 200 to the carrier 102 when the clamp 210 is rotated into the locked configuration.

The length gauge 200 can include a guard 216, which can protect one or more features of the length gauge 200. The guard 216 can be spaced away from the elongate bar 202 by the spacers 220 such that one or more features can be disposed between the guard 216 and the elongate bar 202. The guard 216, as shown, can be made of a clear material to facilitate viewing the features of the length gauge 200 disposed between the guard 216 and the elongate bar 202 such as the scale 240 and computing device 238. The guard 216 can include an opening 218 through which a user can reach to interact with one or more features of the computing device 238.

The length gauge 200 can include a scale 240. The scale 240, which can be an elongate plate, can be coupled to the elongate bar 202. For example, the scale 240 can be coupled to the elongate bar 202 by supports 242. A support 242 can couple one end of the scale 240 to the elongate bar 202 and another support 242 can couple another end of the scale 240 to the elongate bar 202 such that the scale 240 is spaced away from the elongate bar 202, which can help to permit sliding of the computing device 238 along the scale 240. The scale 240 can include one or more indicia (e.g., inches, millimeters, etc.) to indicate the positioning of the caliper 212 and/or computing device 238 along the scale 240.

The length gauge 200 can include a computing device 238, which can be slidably mounted onto the scale 240. The computing device 238 can include a display to convey information to the user. The computing device 238 can include one or more buttons, which can be digital or otherwise, to change the measuring units (e.g., millimeters or inches), zero the computing device 238, and/or turn the computing device 238 on or off. The length gauge 200 can be coupled to a caliper 212. The caliper 212 can be configured to contact a leading edge 104' or trailing edge 105' of a carrier 102' to position the computing device 238 to measure the distance between leading edges 104 or trailing edges 105 of adjacent carriers 102. The caliper 212 can extend away from the computing device 238 to facilitate contact with the leading edge 104 or trailing edge 105 of a carrier 102. The computing device 238 can include a tab 224, which can be a battery cover. The tab 224, which can also be referred to as a protrusion or projection, can be grasped or otherwise pushed or pulled by the user to move the computing device 238 along the scale 240. The tab 224 can extend away from the computing device 238, which can be in a direction that is opposite the caliper 212.

Figure 6A:
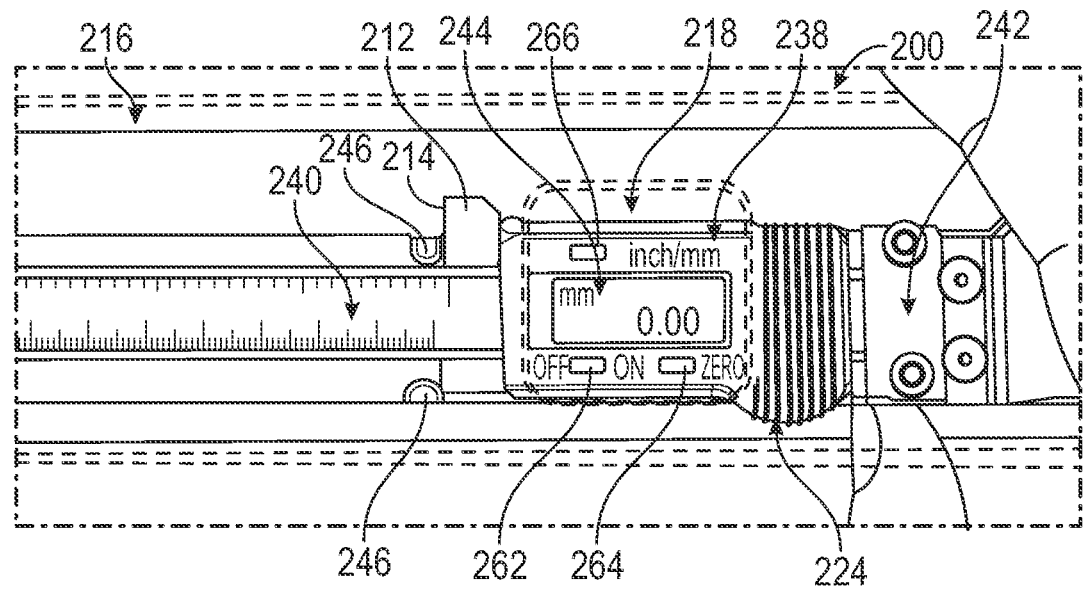
FIG. 6A shows an enlarged view of the length gauge with the length gauge zeroed.

FIGS. 6A-6L show various steps of using the length gauge 200 to quickly and accurately measure the distance between leading edges 104 or trailing edges 105 of adjacent carriers 102 to verify proper relative positioning and facilitate adjustment to within a range of desired distances. As shown in FIG. 6A, the computing device 238 can be slid along the scale 240 to contact a support 242, which can be the support 242 that is closes to the reference block 206. In some variants, the computing device 238 can be slid along the scale 240 to a starting position, which can be contacting the support 242 as described. The user can push or pull on the tab 224 to slide the computing device 238 along the scale 240. The display 244 and/or one or more buttons of the computing device 238 can be aligned with the opening 218 of the guard 216 to enable a user to reach therethrough to interact with the display 244 and/or one or more buttons. For example, the computing device 238 can have a power button 262, zero button 264, and/or unit selection button 266. The zero button 264 can be pushed to zero the computing device 238 in preparation for measuring. In some variants, the computing device 238 contacting the support 242 can be the default zero position of the computing device 238. The unit selection button 266 can be pushed to change a unit of measurement of the computing device 238, which can include changing the unit of measurement between inches and millimeters. In some variants, the computing device 238 can include other interfaces such as one or more touch screens, dials, toggles, switches, etc. which can be used to turn the computing device 238 on or off, change a unit of measurement, and/or zero the computing device 238. In some embodiments, the computing device 238 can transmit signals or information to a remote computing device or terminal, such as a mobile computing device, smartphone, etc., or can be an input to an automated system.

Figure 6B:
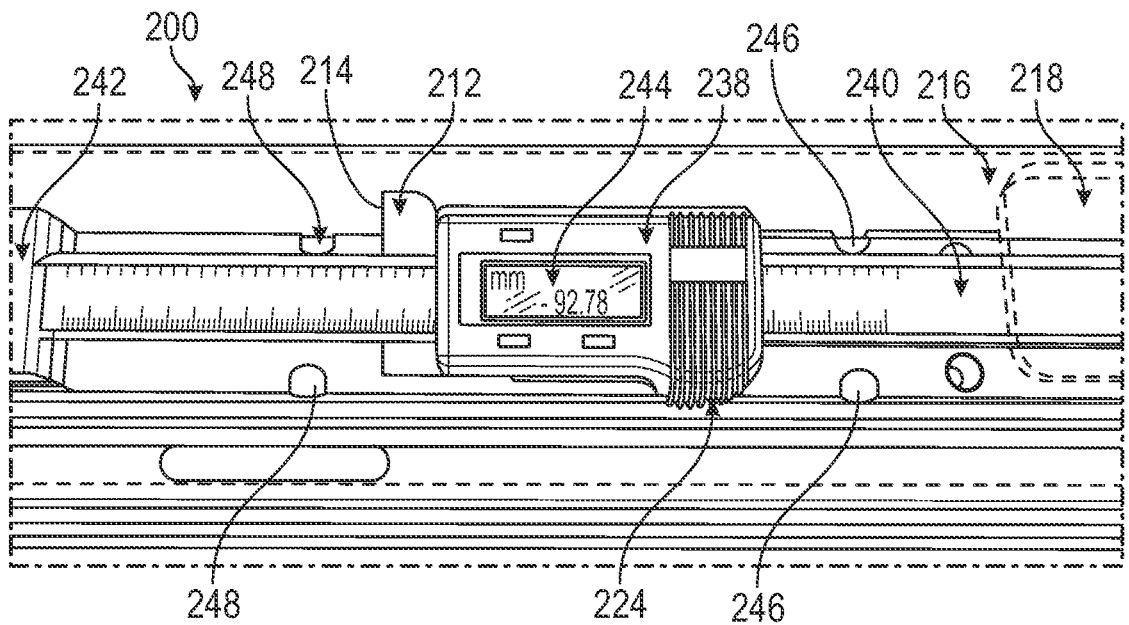
FIG. 6B shows another enlarged view of the length gauge with the computing device disposed between pairs of indicator notches.

As shown in FIG. 6B, the computing device 238 can be moved along the scale 240 to be positioned between the first notches 246 and the second notches 248. The computing device 238 can be moved manually by a user, or can be connected to a motor or other motive force which can move or advance the computing device 238 and/or the connected caliper contact surface 214. In some variants, a single first notch 246 and single second notch 248 can be used. In some variants, another visual indicia can be used to guide positioning the computing device 238 along the scale 240. The positioning of the computing device 238 between the first notches 246 and second notches 248 can be suitable for placing the computing device 238 between the carrier 102 and carrier 102' when mounting the length gauge 200 to the carrier 102. As shown, as the computing device 238 is moved to between the first notches 246 and second notches 248, the display 244 can display the distance traveled by the caliper 212 (e.g., −92.78 mm) from the zeroed or initial position. The display 244, in some variants, can output the distance traveled by the caliper 212 plus the distance (e.g., five hundred millimeters) between the contact surface 208 of the reference block 206 and the caliper 212 when the computing device 238 is disposed in the zeroed or initial position, which can be −592.78 mm or 592.78 mm. The computing device 238 can combine the two distances and output a total distance from a leading edge or trailing edge and the contact surface 208 and the caliper contact surface 214.

Figure 6C:
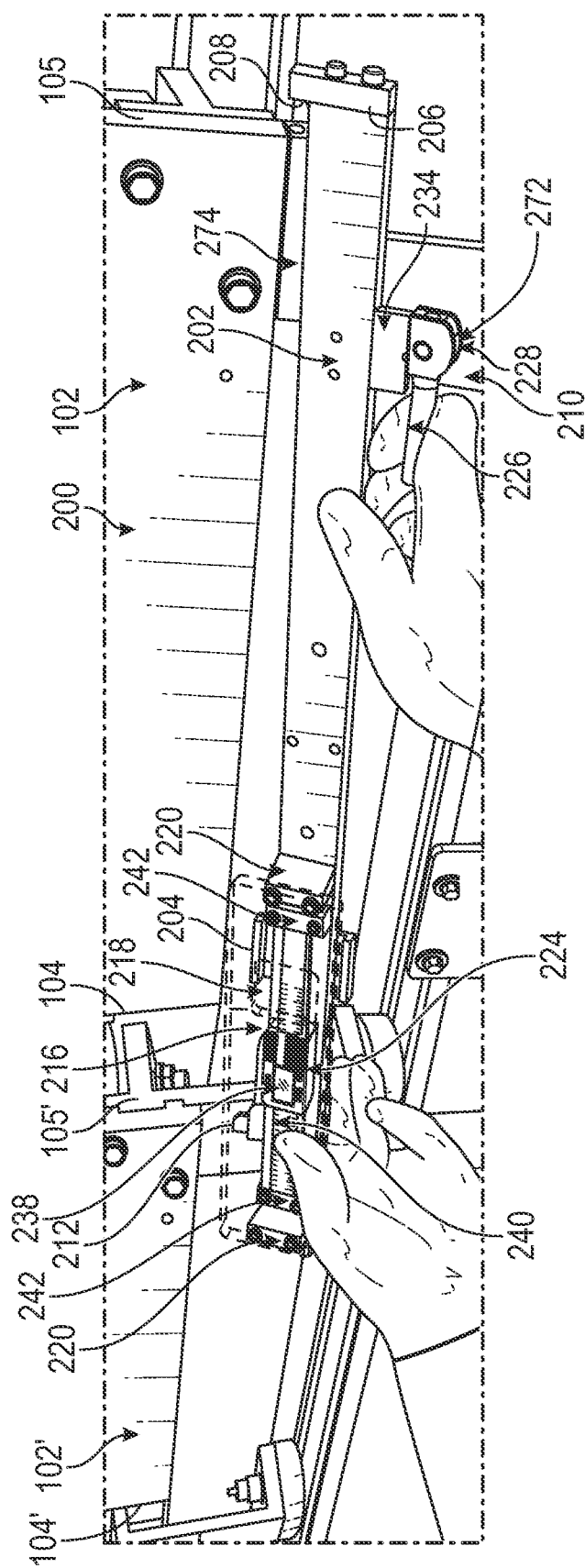
FIG. 6C shows the length gauge being positioned to couple to a first carrier.

As shown in FIG. 6C, the length gauge 200 can be positioned or mounted on the carrier 102. The length gauge 200 can be angled and advanced toward the carrier 102 to hook the hanger 204 around a ledge and/or groove of the carrier 102. The length gauge 200 can be positioned to contact the contact surface 208 of the reference block 206 with the leading edge 104 or trailing edge 105 of the carrier 102. The length gauge 200 can be positioned to place the clamp 210 on a side of the plate 274. The length gauge 200 can be positioned such that the computing device 238 is disposed between the carrier 102 and carrier 102'.

Figure 6D:
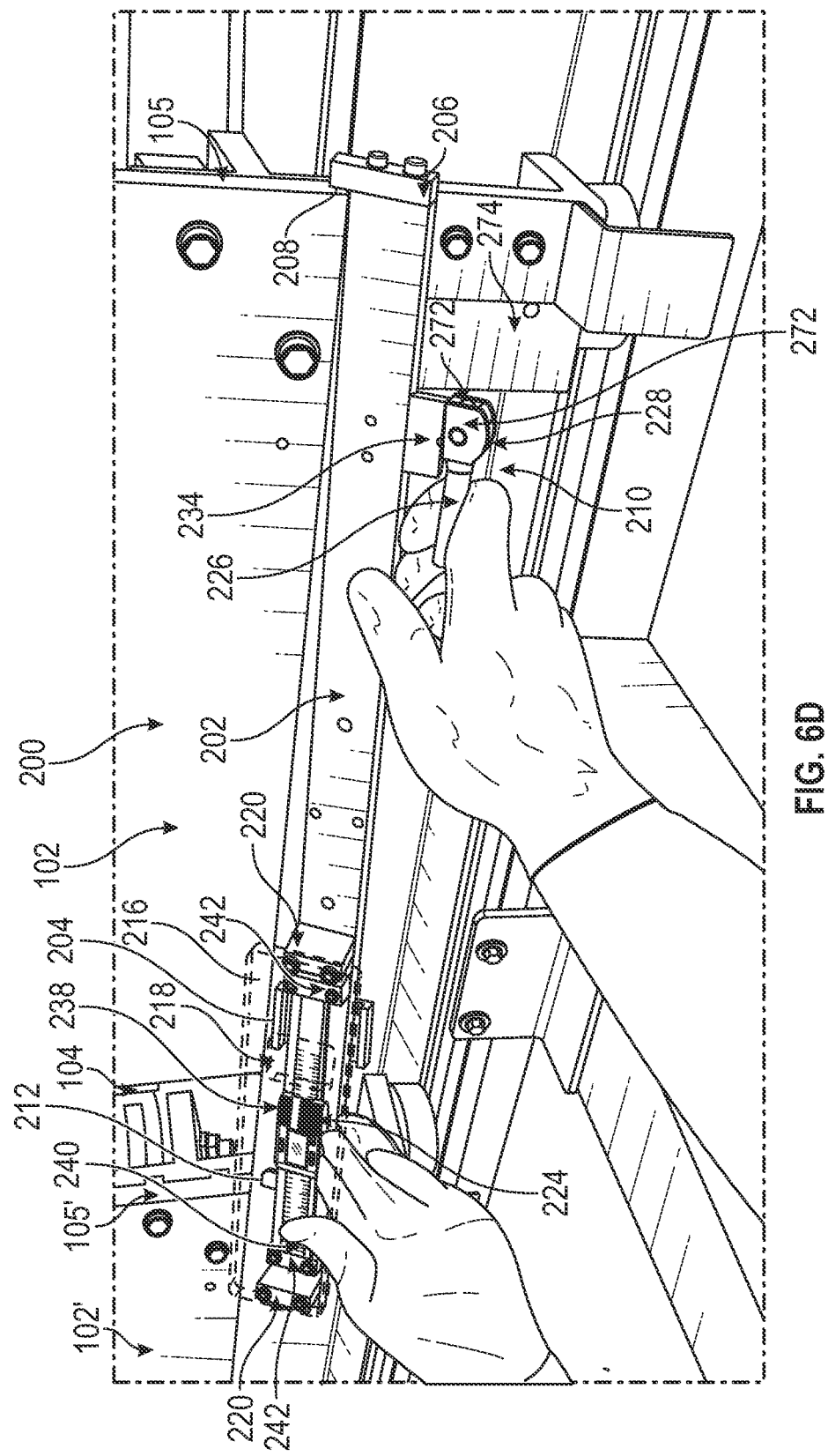
FIG. 6D shows the length gauge being coupled to the first carrier with a reference block contacting a trailing edge of the first carrier.

As shown in FIG. 6D, the length gauge 200 can be rotated back toward the carrier 102 with the hanger 204 contacting the ledge and/or groove of the carrier 102 to hang the length gauge 200 therefrom. The contact surface 208 of the reference block 206 can contact the leading edge 104 or trailing edge 105. The clamp 210 can be disposed approximate a side of the plate 274, which can be opposite the side of the plate 274 that is proximate the reference block 206. The computing device 238 can be disposed between the carrier 102 and carrier 102'. As shown in FIG. 6E, with the length gauge 200 rotated toward the carrier 102, the length gauge 200 can hang from the carrier 102.

Figure 6F:
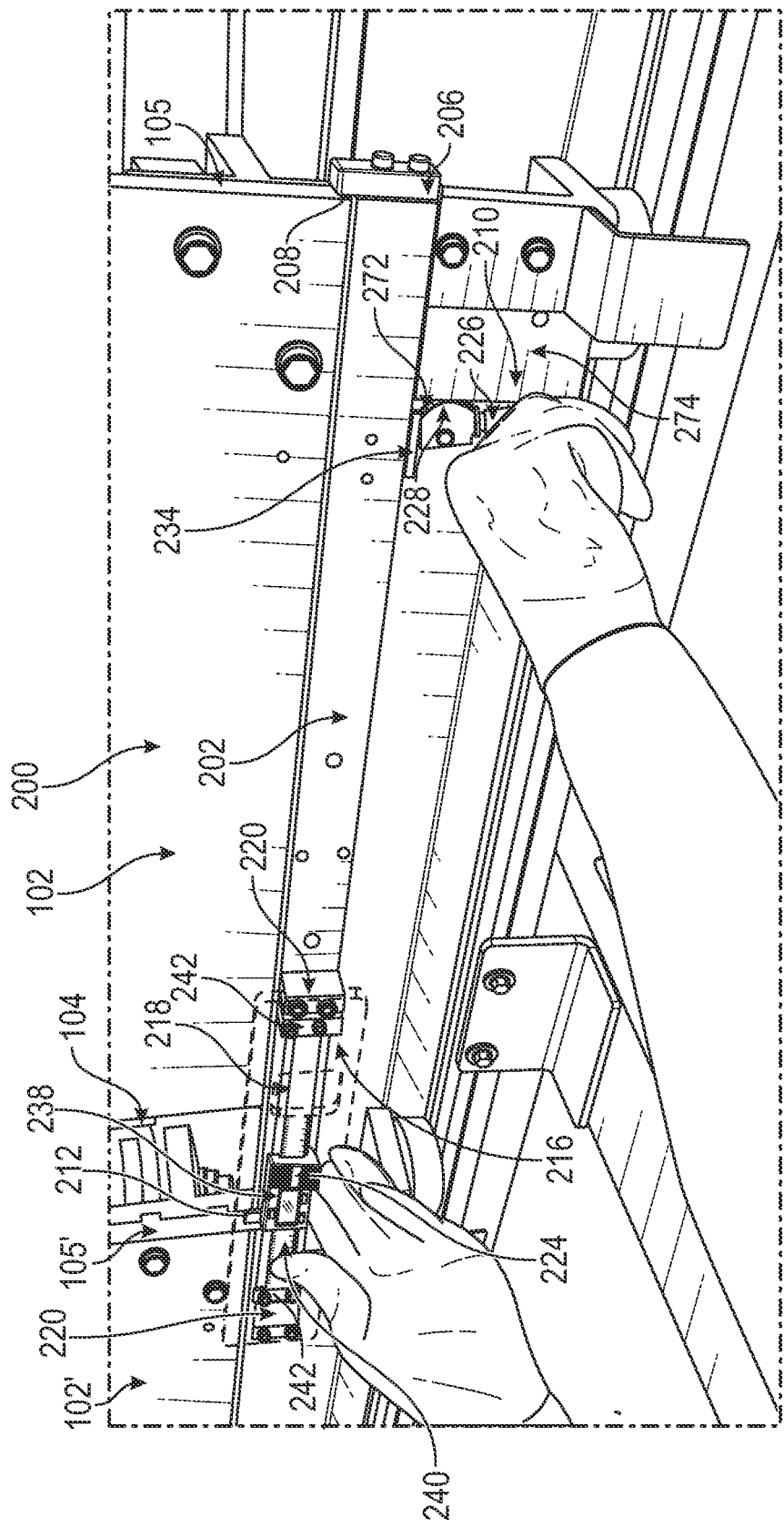
FIG. 6F shows length gauge secured to the first carrier with the clamp in the locked configuration.

To secure or lock the length gauge 200 to the carrier 102, the user can grasp the lever 226 of the clamp 210 and rotate the lever 226 toward the plate 274. As the clamp 210 is rotated, the curved periphery 272 of the engagement portion 228 can be pushed against the plate 274 to secure or lock the length gauge 200 to the carrier 102, as shown in FIG. 6F. For example, the contact with the curved periphery 272 can apply a force in a first direction and the reference block 206 can apply a reactionary force in a second direction that is opposite the first against the leading edge 104 or trailing edge 105 of the carrier 102 that holds the length gauge 200 in place until released. To release the length gauge 200, the user can grasp the lever 226 and rotate away from the plate 274 such that the curved periphery 272 moves away from the plate 274, eliminating the force applied to the plate 274 by the curved periphery 272.

Figure 6G:
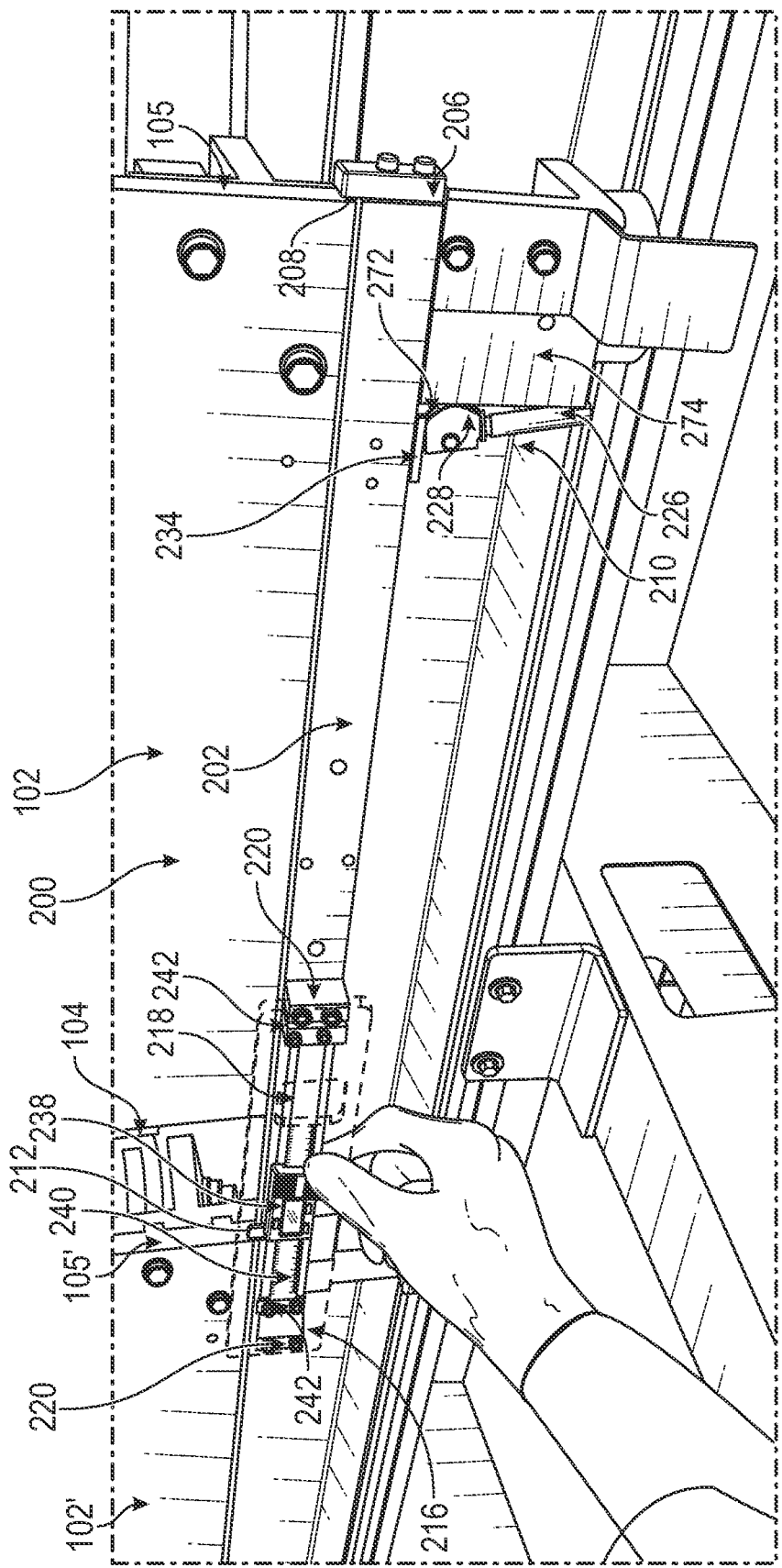
FIG. 6G shows a user manipulating the caliper toward the trailing edge of the second carrier.
Figure 6H:
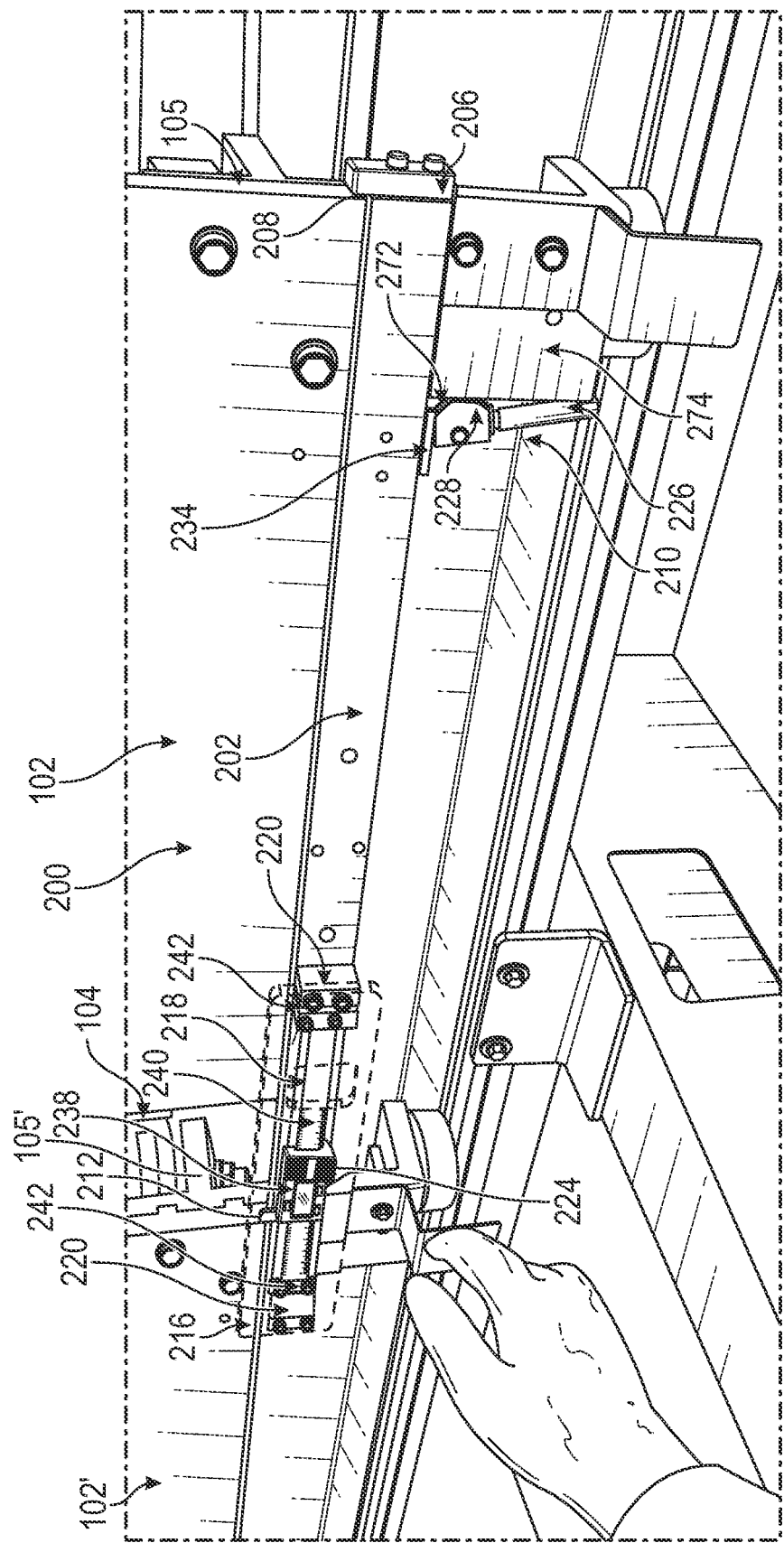
FIG. 6H shows the length gauge with the caliper contacting the trailing edge of the second carrier.

As shown in FIG. 6G, with the length gauge 200 coupled and secured to the carrier 102, the user can push the computing device 238 toward the leading edge 104' or trailing edge 105' of the carrier 102' until the caliper 212 contacts the leading edge 104' or trailing edge 105'. In some variants, the user can push the computing device 238 toward the leading edge 104' or trailing edge 105' of the carrier 102' until the caliper 212 contacts the leading edge 104' or trailing edge 105' before rotating the clamp 210 to secure or lock the length gauge 200 to the carrier 102. The user can then verify the distance between the leading edge 104 or trailing edge 105 of the carrier 102 and the leading edge 104' or trailing edge 105' of the carrier 102', as shown in FIG. 6H.

Figure 6I:
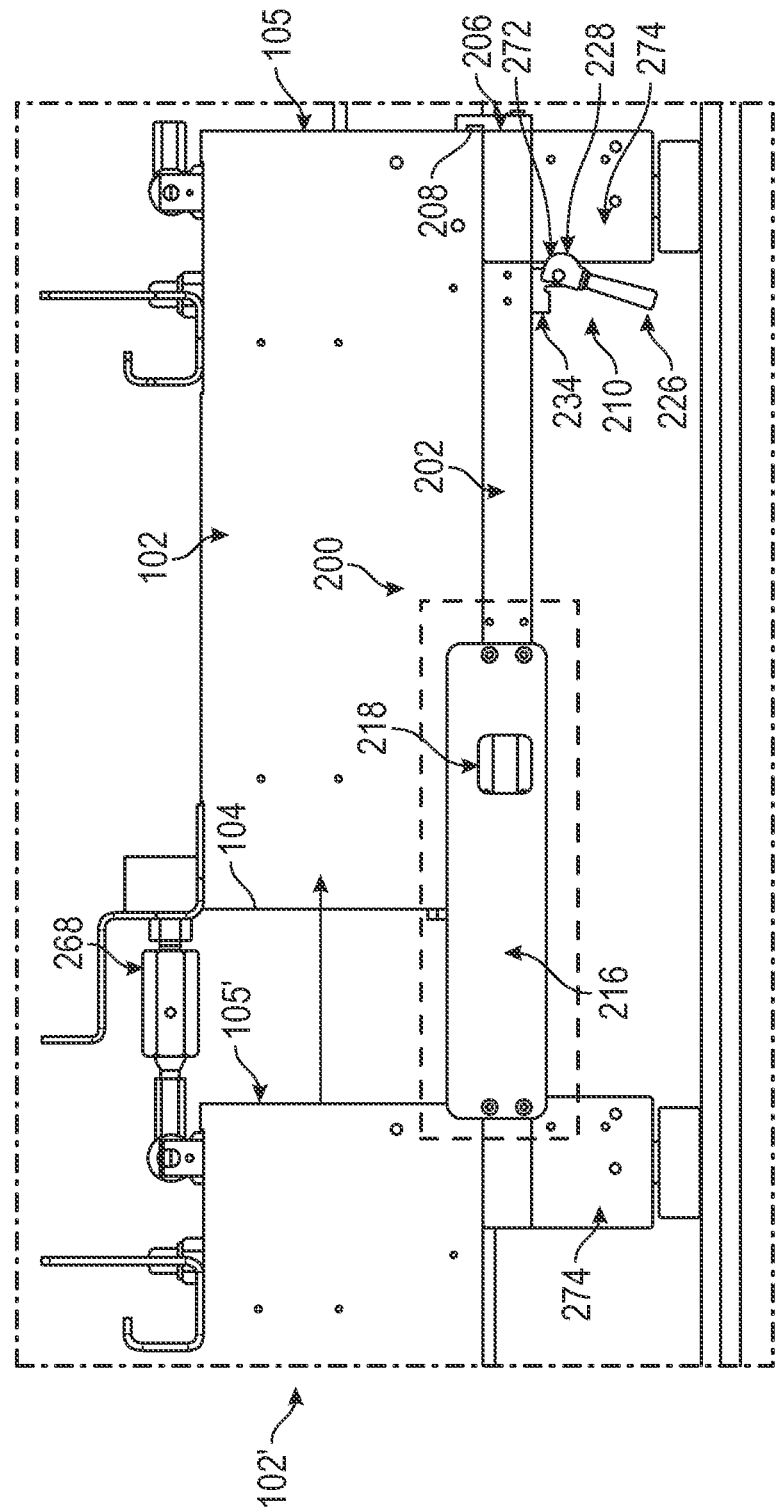
FIG. 6I shows a schematic of a direction of movement of a second carrier toward a first carrier to decrease a distance between trailing edges of first and second carriers.
Figure 6J:
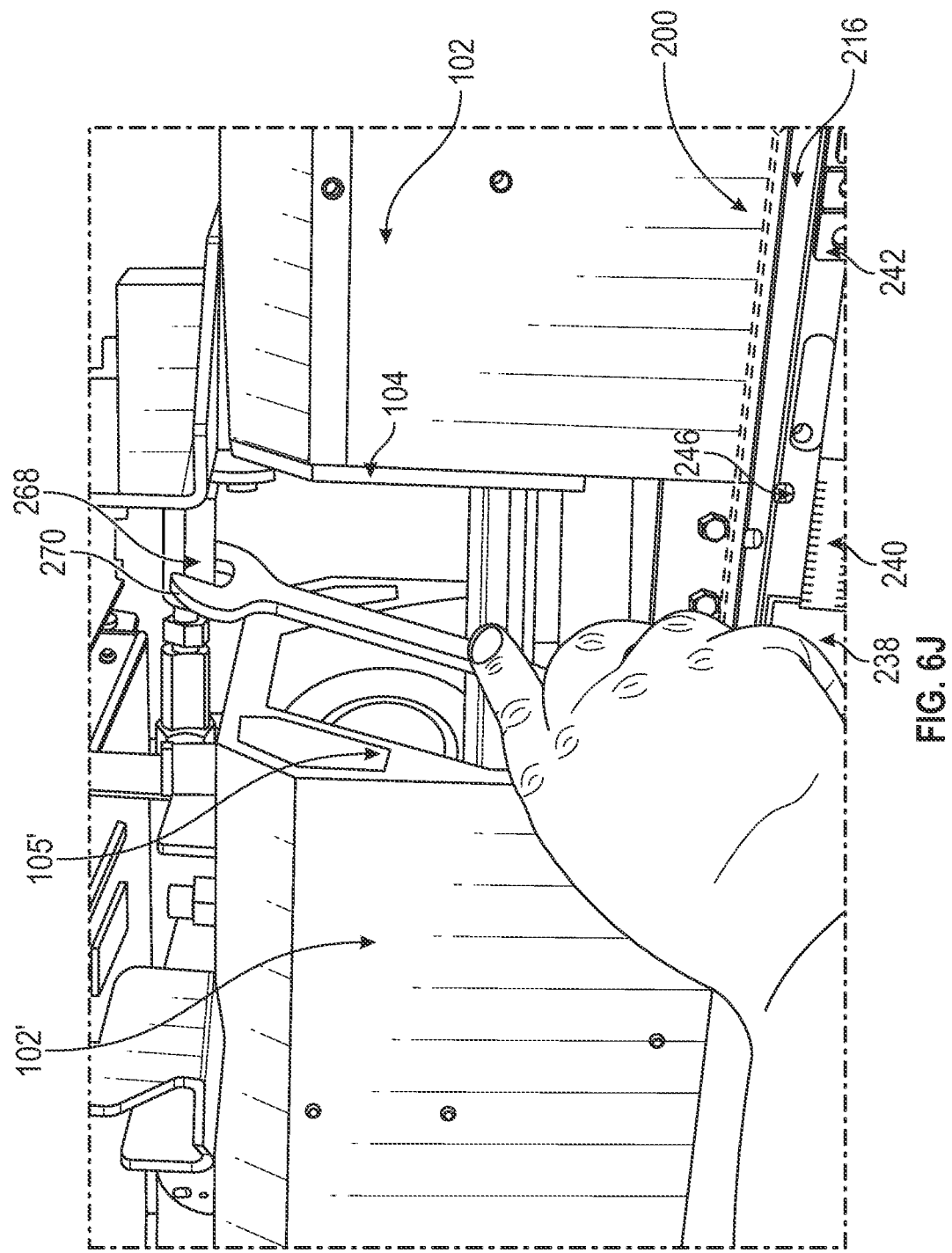
FIG. 6J shows a tool being used to rotate an adjustment mechanism to move a second carrier toward a first carrier to decrease a distance between trailing edges of first and second carriers.

As shown in FIG. 6I, the item processing equipment 100 can have an adjustment mechanism 268 which can be disposed between the carrier 102 and carrier 102'. The adjustment mechanism 268 can be manually manipulated (e.g., rotated) to move the carrier 102 and carrier 102' closer tighter or farther part, as shown in FIG. 6J. The adjustment mechanism 268 can be manipulated (e.g., rotated) by way of a tool 270. In some variants, rotation of the adjustment mechanism 268 in a first direction can move the carrier 102 and carrier 102' closer together while a second direction opposite the first can move the carrier 102 and carrier 102' farther apart. When moving the carrier 102 and carrier 102' closer together, the caliper 212 can maintain contact with the leading edge 104' or trailing edge 105' of the carrier 102 such that the display 244 of the computing device 238 can output the current positioning of the leading edge 104' or trailing edge 105' as the adjustment mechanism 268 is manipulated to move the carrier 102 and carrier 102', enabling the user to adjust the leading edge 104' or trailing edge 105' to a desired position (e.g., 610±6 millimeters). In some embodiments, the adjustment mechanism the adjustment mechanism 268 can be connected to an actuator or motor which operates to turn or adjust the length of a component of the adjustment mechanism 268 to change the length between the adjacent carriers 102 and 102'. In some embodiments, the adjustment mechanism 268 can be automatically moveable via a servo, motor, actuator, or the like. Where the adjustment mechanism 268 is connected to or operable automatically, a user or technician need not use a tool to manually adjust the distance between the first and second carriers 101, 102'. In some embodiments, the computing device 238 can send a signal to a controller in communication with the adjustment mechanism 268 motor or servo, based on the measured distance. The motor or servo can then automatically adjust the distance between the first and second carriers 102, 102', as needed, until the computing device 238 detects the correct or desired distance.

The adjustment mechanism 268 actuator can be connected directly or through a server or other computing device to instruct the adjustment mechanism 268 the distance the adjustment mechanism 268 needs to move to set the proper distance between carriers 102, 102'. The proper distance can be determined by the computing device 238 based on the measurement obtained therefrom, or can be determined by a server (not shown) in communication with the adjustment mechanism 268 actuator and the computing device 238.

As the adjustment mechanism 268 moves to adjust the inter-carrier distance, for example when the inter-carrier distance needs to be shortened, the carrier 102' moves in the direction indicated by the arrow in FIG. 6I, then the edge of the carrier 102' will impinge on the caliper contact surface 214 and push the caliper 212. The movement of the caliper 212 will be indicated on the computing device 238, and the adjustment of the adjustment device when the display 244 reaches the correct measurement indication.

If the inter-carrier distance is to short, the adjustment mechanism will be adjusted to move the carrier 102' in the direction opposite the arrow indicated in FIG. 6I. This may cause the leading edge 104' or trailing edge 105' of the carrier 102' to move away from the caliper contact surface 214, and the computing device 238 may not measure accurately the increasing inter-carrier distance. In this case, an operator may need to move the computing device 238 to keep or re-establish contact between the caliper contact surface 214 and the carrier 102'.

In some embodiments, the caliper contact surface 214 can have a mechanical connector, magnetic connector, or other type of connector which can be activated or connected to removably attach the caliper contact surface 214 to the leading edge 104' or trailing edge 105' of the carrier 102', such that, as the inter-carrier distance increases, the caliper contact surface 214 can increase accordingly as it maintains connection via the magnetic connector with the leading edge 104' or trailing edge 105', enabling a continuous display of the measurement by the computing device 238. The leading edge 104' or trailing edge 105' may have a mechanical connector, may have a magnetic portion attached, or may have another similar mechanism to releasably engage the caliper contact surface 214.

Figure 6K:
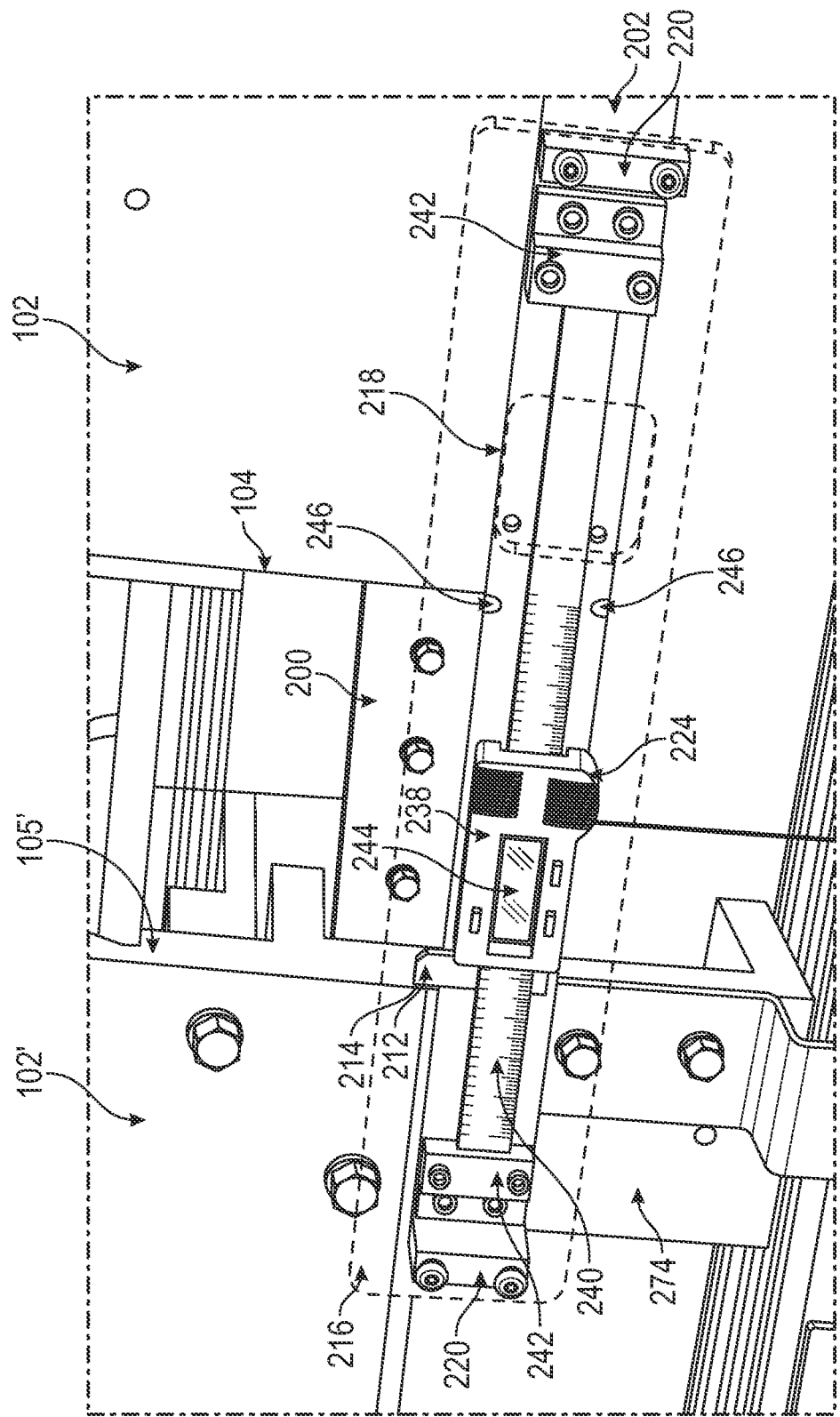
FIG. 6K shows the length gauge coupled to the first carrier with the trailing edges of the first and second carriers spaced away from each other at a desired distance.
Figure 6L:
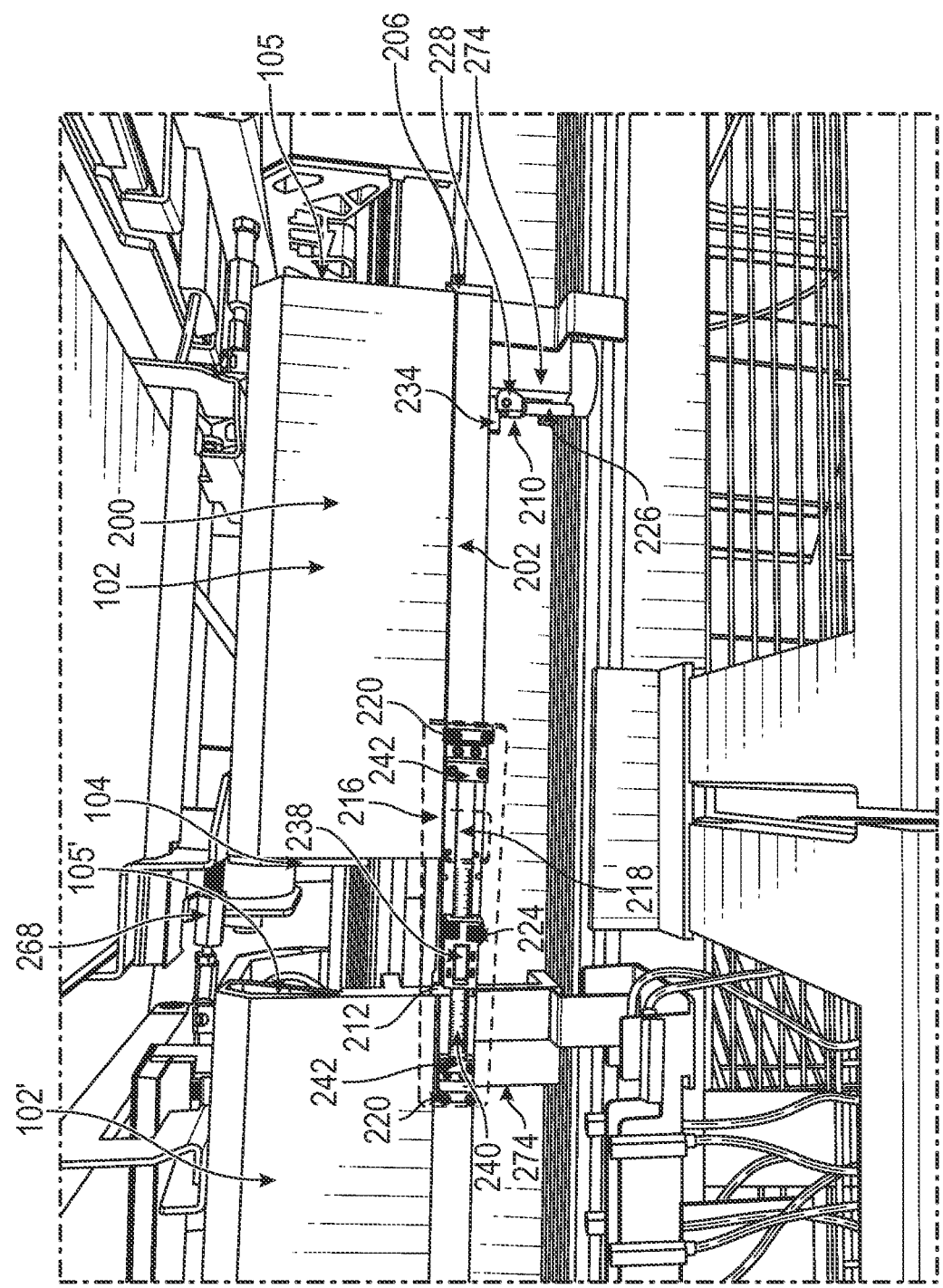
FIG. 6L shows another view of the length gauge coupled to the first carrier with the trailing edges of the first and second carriers spaced away from each other at a desired distance.

As shown in FIGS. 6K and 6L, the display 244 of the computing device 238 can display the position (e.g., 109.90 millimeters) of the caliper 212, which can be indicative of the positioning of the leading edge 104' or trailing edge 105'. As described, the user and/or the computing device 238 can add the measured position (e.g., 109.90 millimeters) to the distance between the caliper 212 in the zeroed position (e.g., initial position) and the contact surface 208 of the reference block 206 for the full distance between the leading edge 104 and leading edge 104' or the trailing edge 105 and trailing edge 105'. Accordingly, the user can quickly measure the distance between the leading edge 104 and leading edge 104' or the trailing edge 105 and trailing edge 105' to verify placement and/or facilitate adjustment to within a desired range of distances between the leading edge 104 and leading edge 104' or the trailing edge 105 and trailing edge 105'.

In some variants, a length gauge can comprise one or more sensors, such as optical sensors. The one or more sensors can be disposed on or connected to a computing device. The one or more sensor can automatically sense the distance between adjacent edges of the carriers 102, 102', or can sense another distance which can be indicative of the distances between leading edges or trailing edges of adjacent carriers. In some variants, the length gauge 200 can include one or more motors to automatically move the caliper and/or computing device 238 to contact the leading edge 104' or trailing edge 105' of the carrier 102'.

In some embodiments, a length gauge comprising a sensor can be connected to or attached to a trailing edge or leading edge of the carrier 102' and is directed toward the leading edge or trailing edge of the carrier 102. The leading edge or trailing edge of the carrier 102 can include a reflective portion or a complementary sensor to enable the sensor on carrier 102' to measure a distance between the carriers 102, 102'. In some embodiments, the sensors can be operable during operation or during downtime of the item processing equipment. The sensors can take automatic length measurements and can generate signals to adjust the distance between adjacent carriers 102, 102' as required to set the proper inter-carrier distance.

The length gauge 200 and the components thereof can be manufacture with a variety of techniques which can include additive manufacturing, casting, machining, etc. The length gauge 200 and the components thereof can be made from a variety of materials which can include polymers (e.g., plastics), metals (e.g., aluminum), and/or metal alloys.

Figure 7A:
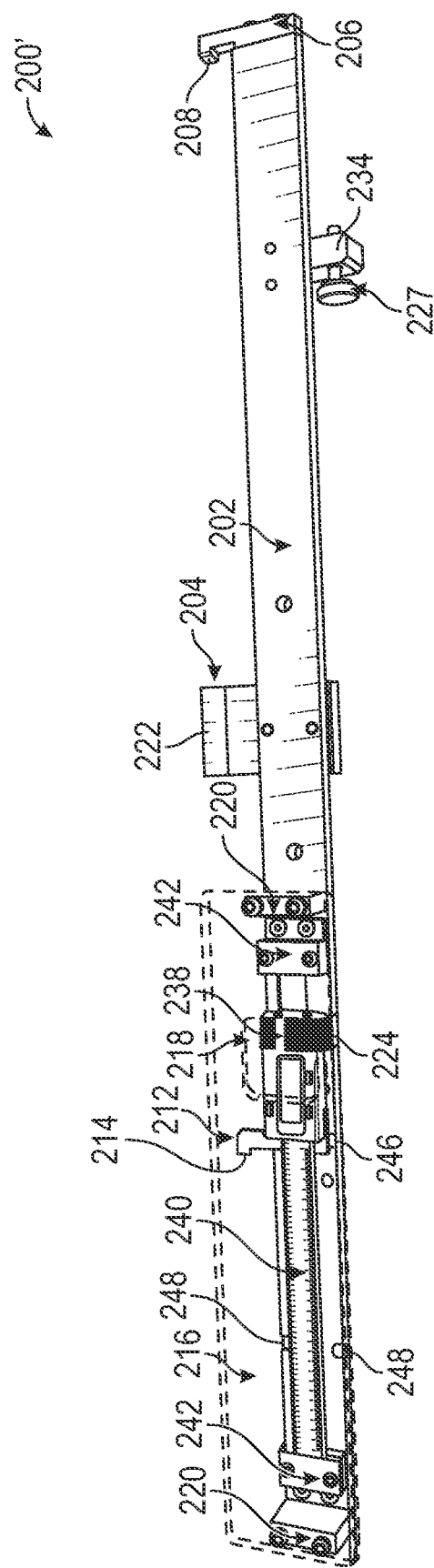
FIG. 7A shows another exemplary length gauge.

FIGS. 7A-7H show various views of another exemplary length gauge 200', which can be the same as the exemplary length gauge 200 but include the differences described herein. For example, as described herein, the length gauge 200 may include a hangar 204. The hangar 204 of the length gauge 200, as illustrated in FIG. 4A, is positioned on the elongate bar 202 at a position between the two spacers 220. As illustrated in FIG. 7A, the length gauge 200' can include a hangar 204, which may be a hook, holder, and/or clip. The hangar 204 is illustrated in FIG. 7A on the elongate bar 202 between the reference block 206 and the spacer 220 that is closest to the reference block 206—similar to FIG. 5. The hangar 204 may be centrally positioned along the elongate bar 202. In some embodiments, the hangar 204 may be disposed at any position along the elongate bar 202.

As shown in FIG. 7A, the length gauge 200' may include a screw 227, which may be a thumb screw and/or bolt. The length gauge 200' may include the screw 227 instead of the clamp 210 described in reference to the length gauge 200. Similar to the clamp 210, the screw 227 may be used to secure, lock, removably attach the length gauge 200' to the carrier 102. In some embodiments, the clamp 210 may loosen over time such that the length gauge 200 is not held in place by the clamp 210. Accordingly, the screw 227 may more reliably, over time, secure the length gauge 200' to carriers 102. The screw 227 may have a longer travel distance compared to the clamp 210, which may enable the screw 227 to better secure the length gauge 200' to carriers 102.

The screw 227 may be coupled to a mount 234, which may be a bar and/or block. The screw 227 may extend through the mount 234. The screw 227 may be rotated in a first direction of rotation to advance the screw 227 through the mount 234. The screw 227 may be rotated in a second direction of rotation, opposite the first direction, to retract the screw 227. The mount 234 may be disposed on a side (e.g., back side) of the elongate bar 202 that is opposite the guard 216. The mount 234 may extend away from the elongate bar 202, which may include in a direction that is transverse and/or perpendicular relative to the longitudinal direction of the elongate bar 202. The mount 234 may be disposed at any position along the elongate bar 202. As illustrated in FIG. 7A, the mount 234 is disposed between the reference block 206 and the hangar 204. The mount 234 may be disposed closer to the end of the elongate bar 202 with the reference block 202 than the opposite end of the elongate bar 202.

To secure or lock the length gauge 200' to the carrier 102, such as the carrier 102 illustrated in FIG. 6D, the user can rotate the screw 227 in the first direction of rotation such that the screw 227 advances toward and contacts the plate 274. The screw 227 can apply a force against the plate 274 in a first direction such that the reference block 206 applies a reactionary force in a second direction that is opposite the first against the leading edge 104 or trailing edge 105 of the carrier 102 to hold the length gauge 200' in place until released. To release the length gauge 200', the user can rotate the screw 227 in the second direction of rotation such that the screw 227 moves away from the plate 274 to eliminate the force applied to the plate 274 by the screw 227 to free the length gauge 200' for removal.

Figure 7B:
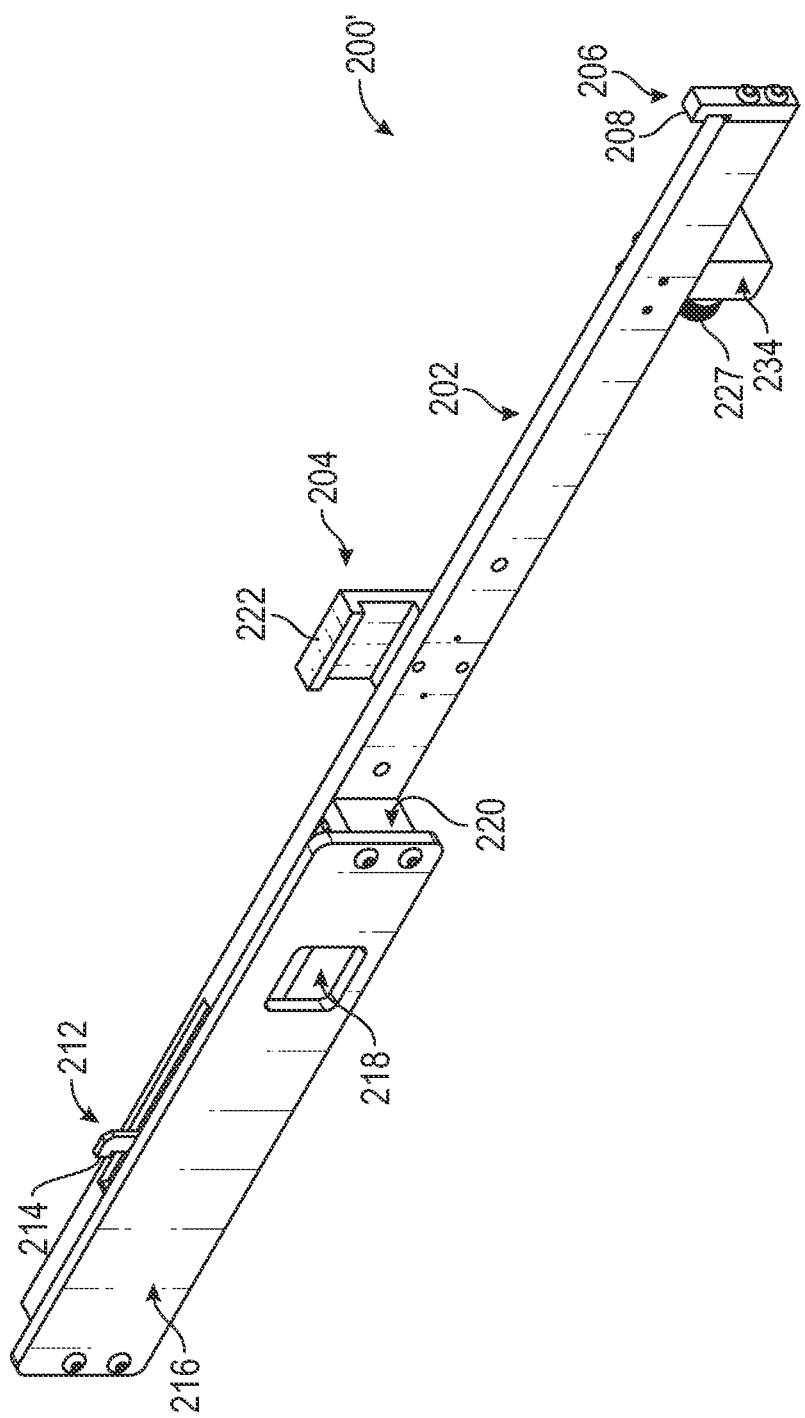
FIG. 7B shows a perspective view of the length gauge of FIG. 7A.
Figure 7C:
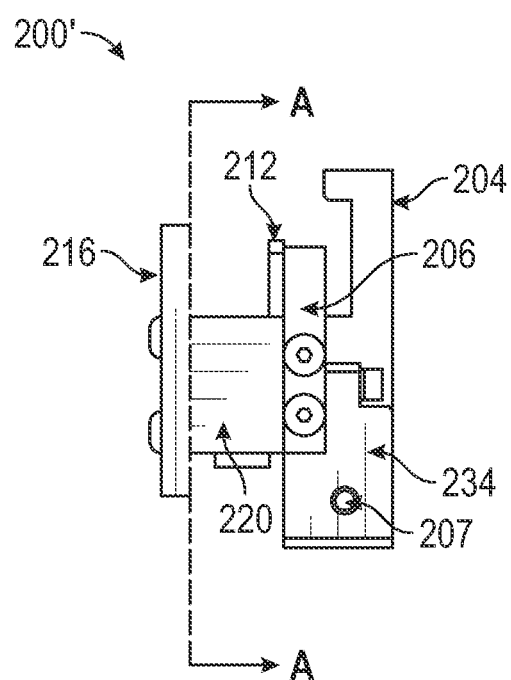
FIG. 7C shows a side view of the length gauge of FIG. 7B.
Figure 7D:
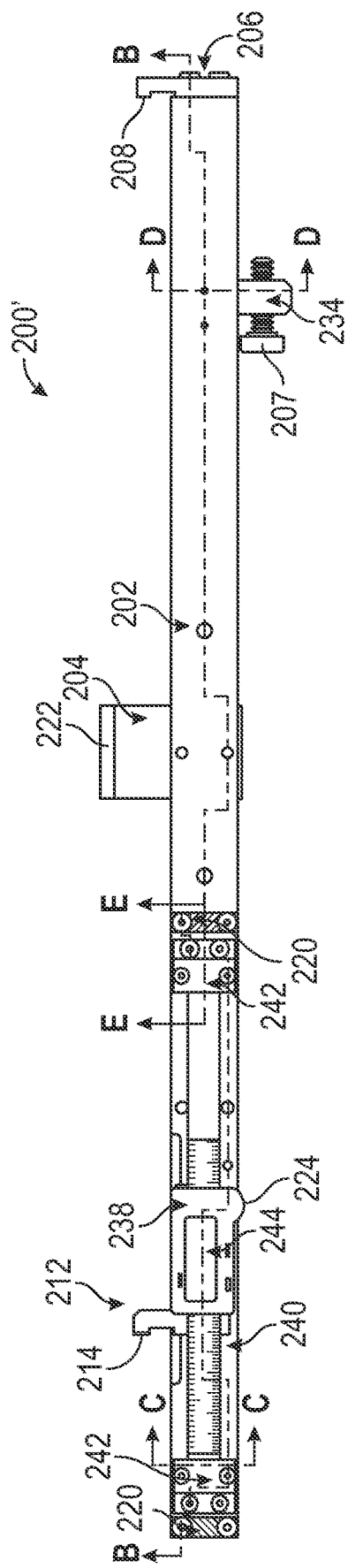
FIG. 7D shows a section view of the length gauge of FIG. 7B.
Figure 7E:
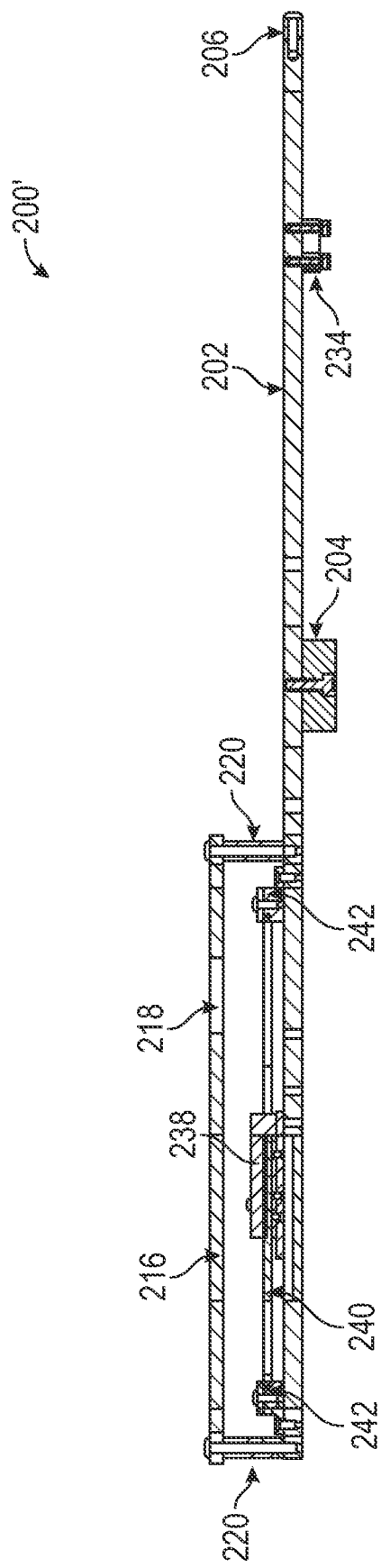
FIG. 7E shows another section view of the length gauge of FIG. 7B.
Figure 7F:
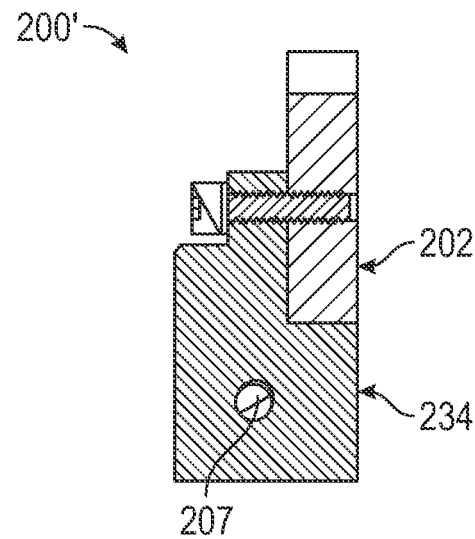
FIG. 7F shows another section view of the length gauge of FIG. 7B.
Figure 7G:
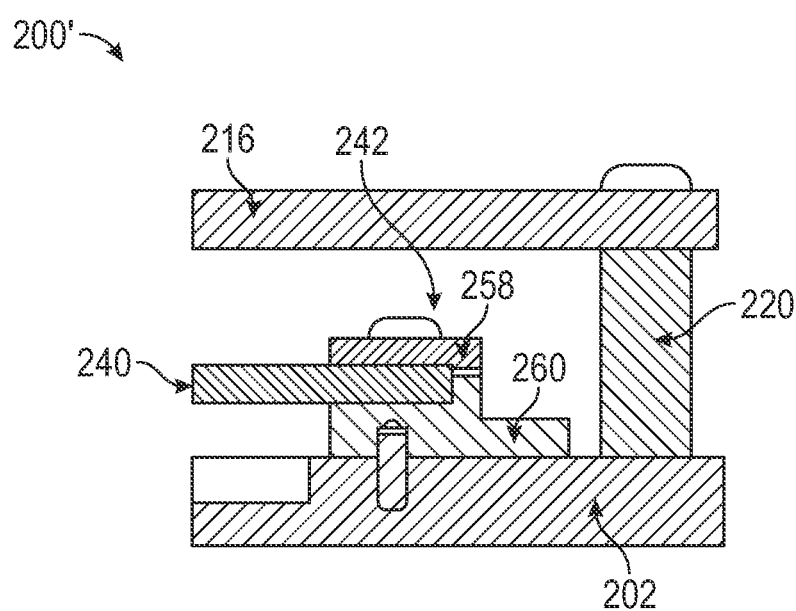
FIG. 7G shows another section view of the length gauge of FIG. 7B.
Figure 7H:
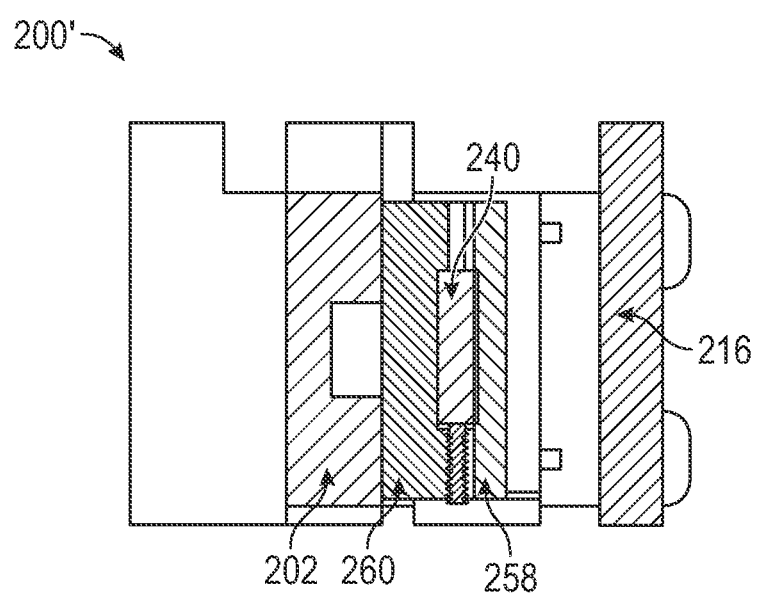
FIG. 7H shows another section view of the length gauge of FIG. 7A.

FIG. 7C shows a side view of the length gauge 200' illustrated in FIG. 7B. FIG. 7D shows a section view of the length gauge 200' along section A-A illustrated in FIG. 7C. FIG. 7E shows a section view of the length gauge 200' along section B-B illustrated in FIG. 7D. FIG. 7F shows a section view of the length gauge 200' along section D-D illustrated in FIG. 7D. FIG. 7G shows a section view of the length gauge 200' along section E-E illustrated in FIG. 7D. FIG. 7H shows a section view of the length gauge 200' along section C-C illustrated in FIG. 7D.

Various illustrative logics, logical blocks, modules, circuits and algorithm steps described in connection with the implementations disclosed herein may be implemented as electronic hardware, computer software, or combinations of both. The interchangeability of hardware and software has been described generally, in terms of functionality, and illustrated in the various illustrative components, blocks, modules, circuits, and steps described above. Whether such functionality is implemented in hardware or software depends upon the particular application and design constraints imposed on the overall system.

In one or more aspects, the functions described herein may be implemented in hardware, digital electronic circuitry, computer software, firmware, including the structures disclosed in this specification and their structural equivalents thereof, or in any combination thereof. Implementations of the subject matter described in this specification also can be implemented as one or more computer programs, e.g., one or more modules of computer program instructions, encoded on a computer storage media for execution by, or to control the operation of, data processing apparatus.

If implemented in software, the functions may be stored on or transmitted over as one or more instructions or code on a computer-readable storage medium. The steps of a method or algorithm disclosed herein may be implemented in a processor-executable software module which may reside on a computer-readable storage medium. Computer-readable storage media includes both computer storage media and communication media including any medium that can be enabled to transfer a computer program from one place to another. A storage media may be any available media that may be accessed by a computer. By way of example, and not limitation, such computer-readable media may include RAM, ROM, EEPROM, CD-ROM or other optical disk storage, magnetic disk storage or other magnetic storage devices, or any other medium that may be used to store desired program code in the form of instructions or data structures and that may be accessed by a computer. Also, any connection can be properly termed a computer-readable medium. Disk and disc, as used herein, includes compact disc (CD), laser disc, optical disc, digital versatile disc (DVD), floppy disk, and Blu-ray disc where disks usually reproduce data magnetically, while discs reproduce data optically with lasers. Combinations of the above can also be included within the scope of computer-readable storage media. Additionally, the operations of a method or algorithm may reside as one or any combination or set of codes and instructions on a machine readable storage medium and computer-readable storage medium, which may be incorporated into a computer program product.

Certain features that are described in this specification in the context of separate implementations also can be implemented in combination in a single implementation. Conversely, various features that are described in the context of a single implementation also can be implemented in multiple implementations separately or in any suitable subcombination. Moreover, although features may be described above as acting in certain combinations and even initially claimed as such, one or more features from a claimed combination can in some cases be excised from the combination, and the claimed combination may be directed to a subcombination or variation of a subcombination.

Similarly, while operations are depicted in the drawings in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system components in the implementations described above should not be understood as requiring such separation in all implementations, and it should be understood that the described program components and systems can generally be integrated together in a single software product or packaged into multiple software products.

Instructions refer to computer-implemented steps for processing information in the system. Instructions can be implemented in software, firmware or hardware and include any type of programmed step undertaken by components of the system.

As can be appreciated by one of ordinary skill in the art, each of the modules of the invention may comprise various sub-routines, procedures, definitional statements, and macros. Each of the modules are typically separately compiled and linked into a single executable program. Therefore, the description of each of the modules is used for convenience to describe the functionality of the system. Thus, the processes that are undergone by each of the modules may be arbitrarily redistributed to one of the other modules, combined together in a single module, or made available in a shareable dynamic link library. Further each of the modules could be implemented in hardware. A person of skill in the art will understand that the functions and operations of the electrical, electronic, and computer components described herein can be carried out automatically according to interactions between components without the need for user interaction.

The foregoing description details certain embodiments. It will be appreciated, however, that no matter how detailed the foregoing appears in text, the development may be practiced in many ways. It should be noted that the use of particular terminology when describing certain features or aspects of the development should not be taken to imply that the terminology is being re-defined herein to be restricted to including any specific characteristics of the features or aspects of the development with which that terminology is associated.

While the above detailed description has shown, described, and pointed out novel features of the development as applied to various embodiments, it will be understood that various omissions, substitutions, and changes in the form and details of the device or process illustrated may be made by those skilled in the technology without departing from the intent of the development. The scope of the development is indicated by the appended claims rather than by the foregoing description. All changes which come within the meaning and range of equivalency of the claims are to be embraced within their scope.

What is claimed is:

1. A length gauge configured to measure a distance between leading or trailing edges of carriers of item processing equipment, the length gauge comprising:
   an elongate bar having a first end and a second end opposite the first end;
   a reference block disposed on the first end of the elongate bar, the reference block configured to contact one of a leading edge and a trailing edge of a first carrier;
   a hanger disposed at a position between the first and second ends of the elongate bar, the hanger configured to couple the length gauge to the first carrier;
   a scale disposed along a portion of the elongate bar, wherein at least a portion of the scale is disposed proximate the second end; and
   a computing device slidably mounted on the scale, the computing device comprising a display and a caliper that is configured to contact one of a leading edge and a trailing edge of a second carrier;
   wherein the display is configured to output a numerical value indicative of a distance between the one of the leading edge and trailing edge of the first carrier and the one of the leading edge and trailing edge of the second carrier.

2. The length gauge of claim 1, further comprising a clamp configured to secure the length gauge to the first carrier.

3. The length gauge of claim 2, wherein the clamp comprises a lever and an engagement portion having a curved periphery, the curved periphery configured to push against a plate of the first carrier when the lever is rotated in a first direction.

4. The length gauge of claim 3, wherein the curved periphery is configured to terminate contacting the plate of the first carrier when the lever is rotated in a second direction that is opposite the first direction.

5. The length gauge of claim 1, further comprising a guard coupled to the elongate bar, the guard configured to protect one or more features of the length gauge.

6. The length gauge of claim 5, wherein the guard is spaced away from the elongate bar by one or more spacers, and wherein the scale and computing device are disposed between the guard and the elongate bar.

7. The length gauge of claim 5, wherein the guard is made of a clear material, enabling a user to view the display of the computing device.

8. The length gauge of claim 5, wherein the guard comprises an opening through which a user can access one or more features of the computing device.

9. The length gauge of claim 5, wherein the guard comprise a width that is larger than a width of the elongate bar.

10. The length gauge of claim 1, wherein the computing device comprises one or more buttons to power the computing device on or off, change measurement units, and/or zero the computing device at an initial position.

11. The length gauge of claim 1, further comprising a screw configured to secure the length gauge to the first carrier.

12. The length gauge of claim 11, wherein the screw is a thumb screw.

13. The length gauge of claim 1, wherein the elongate bar or scale comprises one or more indicia configured to indicate a position of the computing device that corresponds to a position between the first and second carriers when the length gauge is mounted to the first carrier.

14. A length gauge configured to measure a distance between leading edges or trailing edges of carriers of an item processing equipment, the length gauge comprising:
- an elongate bar having a first end and a second end opposite the first end;
- a reference block disposed on the first end of the elongate bar, the reference block configured to contact one of a leading edge and a trailing edge of a first carrier;
- a hanger disposed between the first and second ends of the elongate bar, the hanger configured to hang the length gauge from the first carrier;
- an elongate plate disposed along a portion of the elongate bar proximate the second end; and
- a computing device mounted on the elongate plate, the computing device configured to slide along the elongate plate between an initial position and a second position, wherein the computing device comprises a display and a caliper that is configured to contact one of a leading edge and a trailing edge of a second carrier to measure a distance between the initial position and the second position;
- wherein the display is configured to display an indication of the distance between the initial and second positions that is indicative of a distance between the one of the leading edge and trailing edge of the first carrier and the one of the leading edge and the trailing edge of the second carrier.

15. The length gauge of claim 14, further comprising a clamp that is configured to be rotated between a locked configuration to secure the length gauge to the first carrier and a released configuration to release the length gauge from the first carrier.

16. The length gauge of claim 14, further comprising a guard that is made of a clear material, the guard being spaced away from the elongate bar by one or more spacers and configured to protect one or more features of the length gauge.

17. The length gauge of claim 14, further comprising a screw configured to secure the length gauge to the first carrier.

18. The length gauge of claim 14, wherein the elongate bar comprises one or more indicia configured to indicate a position of the computing device that corresponds to a position between the first and second carriers when the length gauge is mounted to the first carrier.

19. A method of measuring a distance between leading edges or trailing edges of two carriers, the method comprising:
- positioning a computing device of a length gauge at an initial position;
- zeroing the computing device at the initial position;
- moving the computing device to an intermediate position between at least two indicia disposed on a scale or elongate bar of the length gauge;
- connecting the length gauge to a first carrier such that a reference block of the length gauge contacts one of a leading edge and a trailing edge of the first carrier;
- moving the computing device to a second position such that a caliper thereof contacts one of a leading edge and a trailing edge of a second carrier; and
- securing the length gauge to the first carrier;
- wherein the computing device displays an indication of a distance between the initial and second positions that is indicative of a distance between the one of the leading edge and trailing edge of the first carrier and the one of the leading edge and the trailing edge of the second carrier.

20. The method of claim 19, wherein securing the length gauge to the first carrier comprises rotating a screw to push against a plate of the first carrier, resulting in the plate being held between the reference block and an end of the screw.

* * * * *